(12) United States Patent
Budd et al.

(10) Patent No.: US 11,866,192 B2
(45) Date of Patent: Jan. 9, 2024

(54) SYSTEM AND METHOD FOR RECONNECTABLY COUPLING AN AFT VEHICLE TO A FORWARD VEHICLE IN FLIGHT

(71) Applicant: Sky Launch Corporation, Lancaster, CA (US)

(72) Inventors: Gerald D. Budd, Lancaster, CA (US); Thomas Milton McNicholas, Laguna Niguel, CA (US); Angela Monheim, Rapid City, SD (US)

(73) Assignee: Sky Launch Corporation, Lancaster, CA (US)

( * ) Notice: Subject to any disclaimer, the term of this patent is extended or adjusted under 35 U.S.C. 154(b) by 2 days.

(21) Appl. No.: 17/725,889

(22) Filed: Apr. 21, 2022

(65) Prior Publication Data
US 2022/0348346 A1 Nov. 3, 2022

Related U.S. Application Data

(60) Provisional application No. 63/181,637, filed on Apr. 29, 2021.

(51) Int. Cl.
*B64D 39/06* (2006.01)
*B64D 3/00* (2006.01)
*B64D 39/02* (2006.01)

(52) U.S. Cl.
CPC ............ *B64D 39/06* (2013.01); *B64D 3/00* (2013.01); *B64D 39/02* (2013.01)

(58) Field of Classification Search
CPC ........... B64D 3/00; B64D 39/02; B64D 39/06
See application file for complete search history.

(56) References Cited

U.S. PATENT DOCUMENTS 6,604,711 B1 8/2003 Stevens et al.
7,152,828 B1 12/2006 Garcia, Jr. et al.
(Continued)

FOREIGN PATENT DOCUMENTS

DE 3840243 A1 * 5/1990 ............... B64D 3/00
EP 1370461 B1 9/2004
(Continued)

OTHER PUBLICATIONS

Machine translation of DE-3840243-A1, Borberg H, May 1990 (Year: 1990).*

*Primary Examiner* — Tien Q Dinh
*Assistant Examiner* — Katherine June Bolek
(74) *Attorney, Agent, or Firm* — Lance M. Pritikin

(57) ABSTRACT

Disclosed are systems and methods for reconnectably coupling an aft vehicle to a forward vehicle in flight. A docking structure is affixed to the forward vehicle. A coupler has a line connection portion, a probe receiver port, and a plurality of aerodynamic controls. The probe receiving port receives and releasably retains a probe portion of the aft vehicle. A tow line has a proximal end, a distal end, and a line extension length. The proximal end may be attached to the tow actuation element. The distal end is connectable to the coupler. The tow actuation element is configured to adjust the line extension length. The aerodynamic control elements are configured to adjust lateral and vertical positioning of the coupler with respect to the probe portion when the system is in flight. Movement of the coupler is restrained with respect to the docking structure when docked thereto.

8 Claims, 13 Drawing Sheets

(56) References Cited

U.S. PATENT DOCUMENTS

| | | | |
|---|---|---|---|
| 7,887,010 B2 | 2/2011 | Takacs et al. | |
| 11,014,671 B2 | 5/2021 | Gallo | |
| 11,465,768 B2 * | 10/2022 | Meidad | B64C 13/02 |
| 2002/0074455 A1 * | 6/2002 | Ollar | B64D 39/02 |
| | | | 244/135 A |
| 2007/0108339 A1 * | 5/2007 | Plotkin | B64D 39/04 |
| | | | 244/135 A |
| 2011/0001011 A1 * | 1/2011 | Degiorgis | B64D 39/00 |
| | | | 244/135 A |
| 2018/0032089 A1 * | 2/2018 | Vander Lind | B64D 47/08 |
| 2018/0162530 A1 * | 6/2018 | Klein | B64D 1/02 |
| 2023/0034258 A1 | 2/2023 | Gallo et al. | |

FOREIGN PATENT DOCUMENTS

| | | | |
|---|---|---|---|
| WO | WO-0224529 A1 * | 3/2002 | B64D 1/18 |
| WO | WO-02076826 A1 * | 10/2002 | B64C 39/024 |
| WO | WO-2013016173 A2 * | 1/2013 | B64D 39/02 |
| WO | WO-2013102903 A2 * | 7/2013 | B64D 3/00 |

* cited by examiner

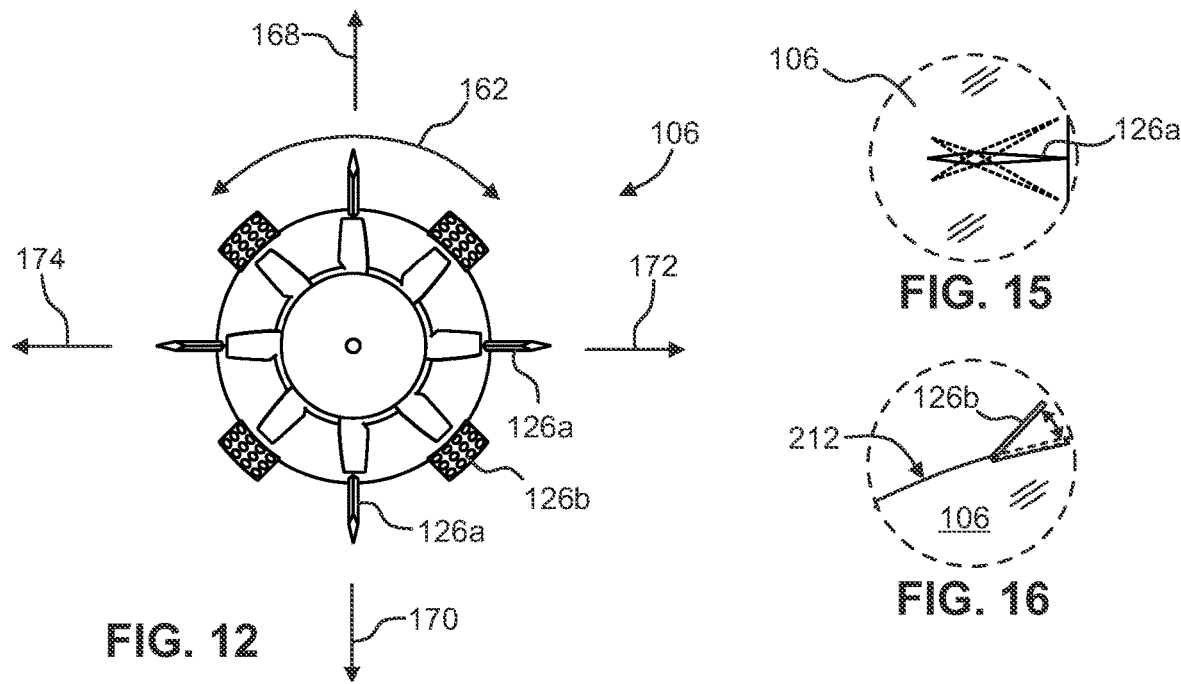
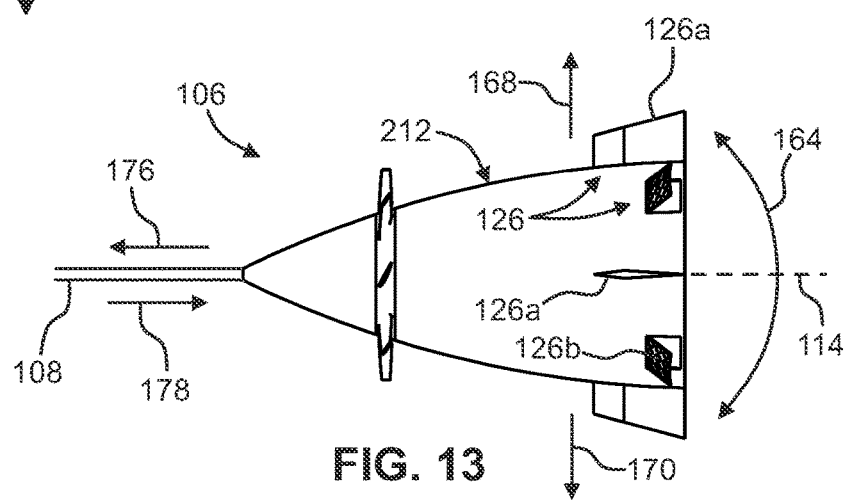
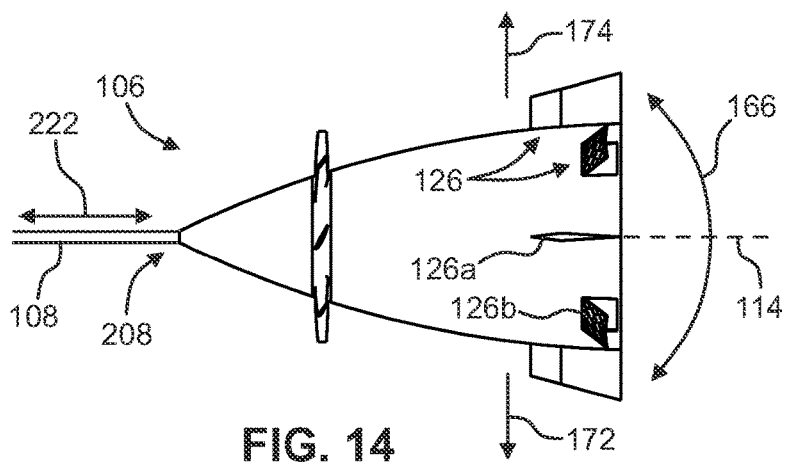

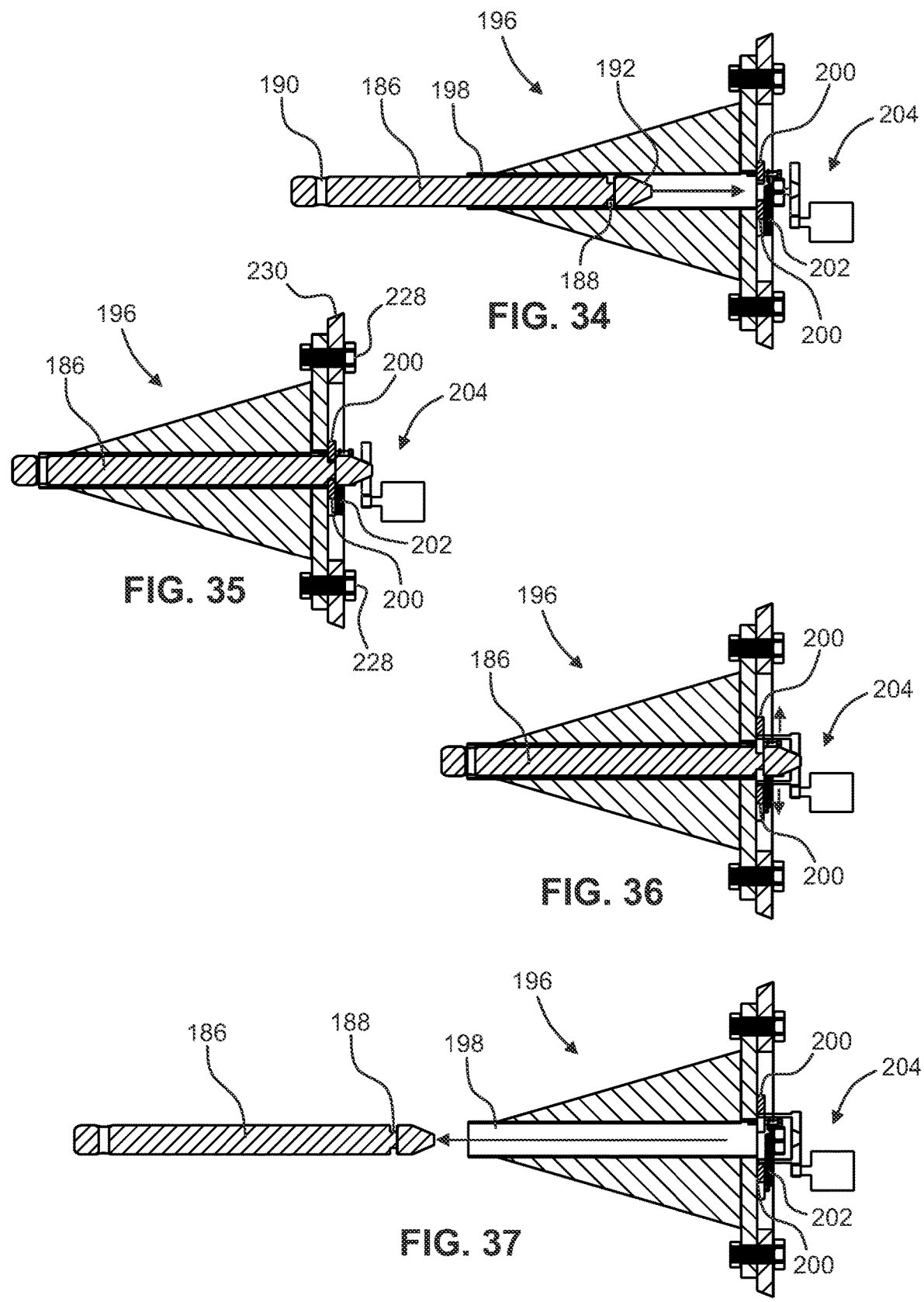

SYSTEM AND METHOD FOR RECONNECTABLY COUPLING AN AFT VEHICLE TO A FORWARD VEHICLE IN FLIGHT

RELATED APPLICATIONS

This application claims the benefit of U.S. Provisional Application No. 63/181,637 filed Apr. 29, 2021, the contents of which are incorporated by this reference in their entireties for all purposes as if fully set forth herein.

TECHNICAL FIELD

The disclosure herein relates generally to systems and methods for in-flight towing and refueling of an aft aeronautical vehicle by a forward aeronautical vehicle.

BACKGROUND

The towing of one aircraft by another has been practiced since the dawn of the early days of aviation. Similarly, in-flight refueling has been utilized since 1923 to connect one aircraft to another in flight for purposes of transferring fuel to extend the secondary aircraft's range and/or endurance. However, unlike refueling, towing aircraft has conventionally been a once-per-flight event as there have been no practical methods developed for reconnecting a tow line in flight.

For conventional in-flight refueling, the military primarily utilizes two different methodologies, both involving short fuel transfer distances (less than ~100 feet) while connected for refilling. The Air Force uses a rigid boom with maneuvering vanes mounted to the aft end of the boom that are controlled by an operator looking aft from the tail of the tanker aircraft. This allows the boom operator to manually position the refueling probe at the desired location on, or near, the receiving aircraft. However, turbulence and/or poor visibility can hinder or prohibit the successful connection between the aircraft due to the visual aspects of operating the system. The Navy uses a hose with a static basket that the receiving aircraft must engage the fuel probe into, enabling the flow of fuel to the receiving aircraft.

Each of these conventional aerial refueling methodologies has inherent physical limitations that present operational and safety challenges. One is the dynamics of the boom or hose. The boom, while controllable, is limited by the operator's skill, visibility, and turbulence levels. Also, the boom is limited in its length, which requires the two aircraft to operate in close proximity to each other during the refueling process, a potential safety issue in poor weather. The hose and basket methodology used by the Navy is simpler, but it requires the pilot of the receiving aircraft to dynamically maneuver their aircraft to connect with a static basket that often is moving around at rates and distances that make the task extremely difficult.

In both cases the receiving aircraft (a low frequency device in terms of maneuverability due to its mass and inertia) is attempting to "mate" or connect with a much higher frequency device (the boom, or basket). When random disturbances (e.g., turbulence, weather, or the constant change in relative positions of the two aircraft) are input into the system, along with adverse human factors such as darkness or poor visibility, the task required can be formidable, and at times unachievable.

SUMMARY

One or more deficiencies of the prior art are solved by way of embodiments of a system and method for reconnectably coupling an aft vehicle to a forward vehicle in flight in accordance with the present disclosure. In certain implementations, these systems and methods allow for the reconnecting of a tow line to a towed aircraft in flight, enabling a multitude of primary and derivative applications.

The systems and methods disclosed herein have multiple applications for both military and civil use. For example, it can be used to attach or reattach a tow line to a secondary (or multiple) aircraft while in flight or on the runway; it can be used to deploy and retrieve unmanned aerial vehicles from a "mother ship"; it can be used for autonomous in-flight refueling; and it can be used to reposition high-altitude long endurance aircraft at different altitudes and locations.

Certain preferred embodiments of the systems and methods disclosed herein solve one or more of the above-mentioned deficiencies of the prior art in part by utilizing the higher relative maneuverability of a controlled coupling device, located at the tip of a tow line (which may take the form of a fuel hose in some cases) to actively position itself in front of an aft, lower relative maneuverability, vehicle to be captured. Once the controlled coupling device and the aft vehicle are aligned laterally and vertically, the relative longitudinal distance between the controlled coupling device and the aft vehicle may be reduced through, for example, airspeed/energy management until contact is achieved, and the connection between the forward and aft vehicles is mechanically secured. The relative distance between the controlled coupling device and the aft vehicle may also be reduced by extending the tow line further from the forward vehicle (e.g., tow aircraft) until a connection between the forward and aft vehicles is mechanically secured.

Particular implementations of this technology may also enable all-weather operations due to the autonomous systems utilized. Moreover, this technology may enable long line operations (potentially up to 1000 feet line length, or more) that historically have been avoided due to the difficulty of the dynamics inherent in line lengths greater than 100 feet.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 12 is a diagrammatic front view of an example coupler element;

FIG. 13 is a diagrammatic side view of the coupler element of FIG. 12;

FIG. 14 is a diagrammatic top view of the coupler element of FIG. 12;

FIG. 15 is a diagrammatic detail view of an example primary control surface and illustrating the pivotal actuation thereof;

FIG. 16 is a diagrammatic detail view of an example draft flap and illustrating the extension and retraction thereof;

FIG. 34 is a diagrammatic cross-sectional view taken along lines 34-34 in FIG. 33, showing an example tow pin being inserted into the pin barrel of the example tow pin engagement element;

FIG. 35 is a diagrammatic cross-sectional view similar to FIG. 34, but wherein the tow pin is shown engaged by the pin detent latch;

FIG. 36 is a diagrammatic cross-sectional view similar to FIG. 35, but wherein the pin detent latch has been moved out of its latch position so as to release the tow pin to be removed from the pin barrel;

FIG. 37 is a diagrammatic cross-sectional view similar to FIG. 36, but wherein the tow pin has been removed from the pin barrel;

DETAILED DESCRIPTION OF THE PREFERRED EMBODIMENTS

Figure 1:
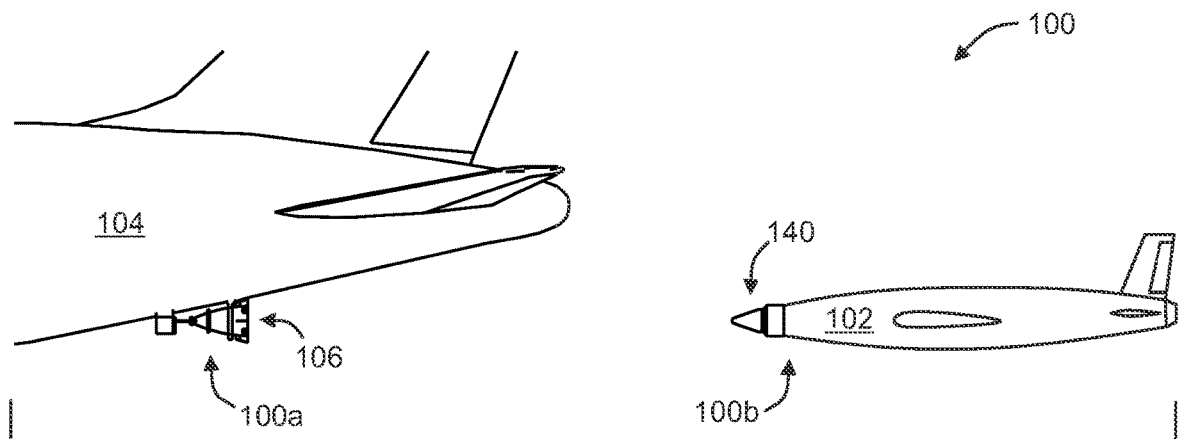
FIG. 1 is a diagrammatic side view illustrating one example system for reconnectably coupling an aft vehicle to a forward vehicle in flight, wherein the coupler element is shown in a docked position with respect to the docking structure.

Referring now to the drawings, like reference numerals designate identical or corresponding features throughout the several views.

With reference to the several drawings, example embodiments of a system for reconnectably coupling an aft vehicle 102 to a forward vehicle 104 in flight are shown generally at 100. Moreover, a forward portion of the system 100 is shown generally at 100a, and an aft portion of the system 100 is shown generally at 100b.

Figure 2:
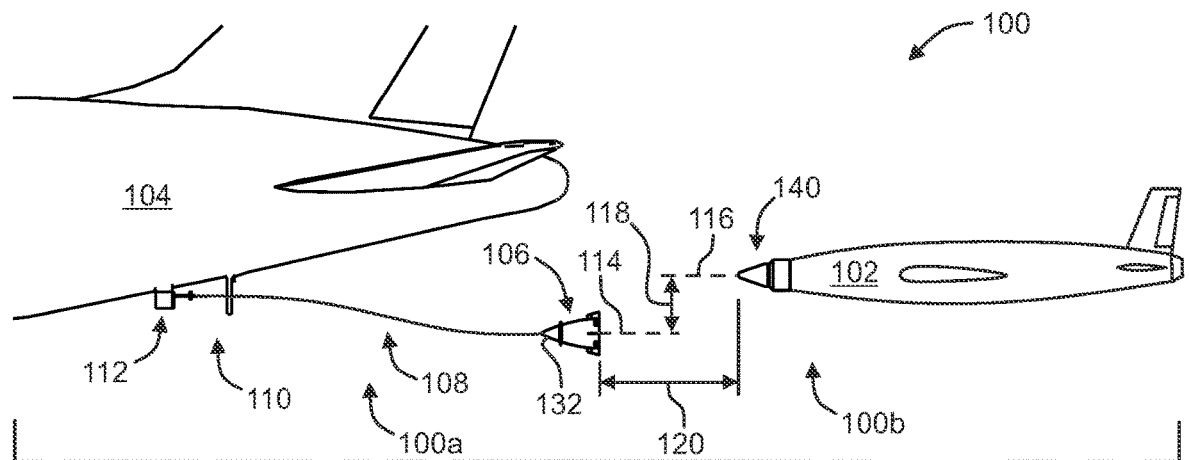
FIG. 2 is a diagrammatic side view similar to that of FIG. 1, but wherein the coupler element is shown in an undocked position with respect to the docking structure, and the radial and longitudinal offsets between the coupler element and the probe portion of the aft vehicle are being determined.
Figure 3:
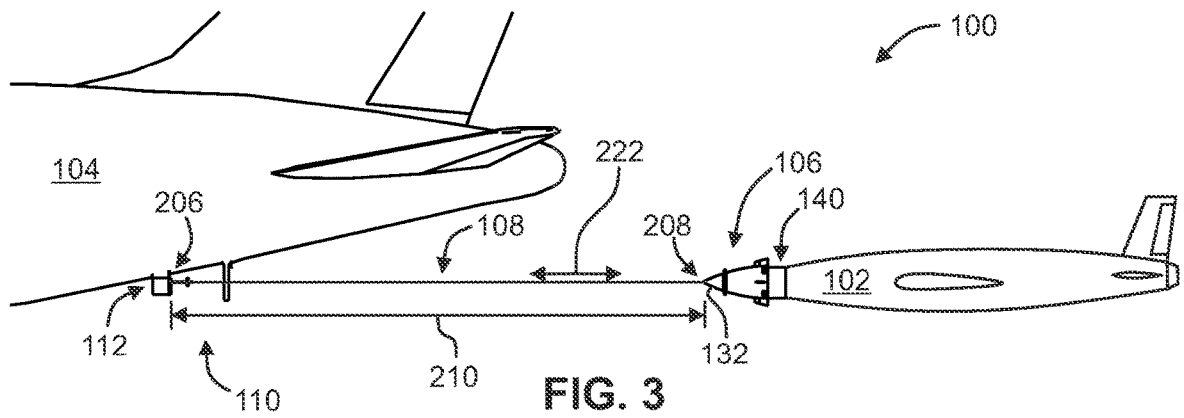
FIG. 3 is a diagrammatic side view similar to that of FIG. 2, but wherein the probe portion of the aft vehicle is shown securely received by the probe receiving port of the coupler element.
Figure 4:
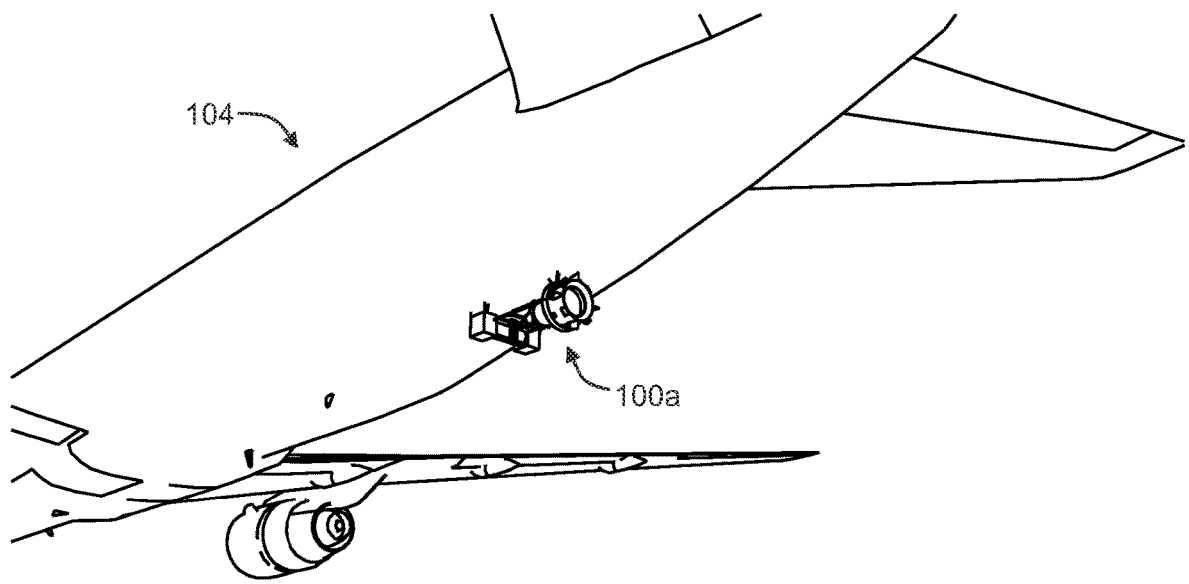
FIG. 4 is a diagrammatic partial perspective view of the forward portion of the example system shown in FIG. 1, wherein the docking structure is shown affixed to a forward vehicle and the coupler element is shown in a docked position.

Referring to FIGS. 2 and 3, preferred implementations of the system 100 may comprise a docking structure 110, a tow actuation element 112, a coupler element 106, and a tow line element 108.

Figure 5:
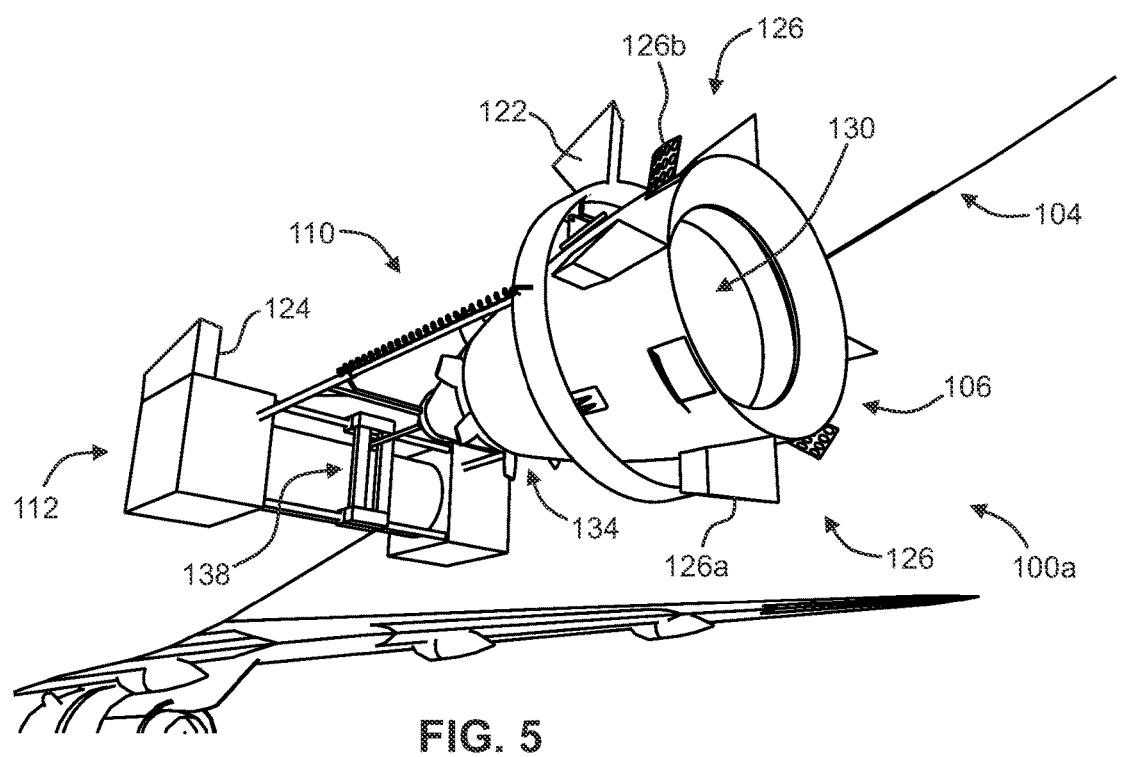
FIG. 5 is a magnified view of a portion of FIG. 4, showing details of the forward portion of the example system.

Referring to FIG. 5, the docking structure 110 may be configured to be affixed to the forward vehicle by way of, for example, one or more dock mounting brackets 122. The tow actuation element 112 may be configured to be affixed to the forward vehicle 104 by way of one or more winch mounting brackets 124, or by being rigidly affixed to the docking structure 110. The tow actuation element 112 may be, for example, a powered winch or similar device. The tow actuation element 112 may include a line guide 138. Moreover, referring to FIG. 8, the tow actuation element 112 may be aerodynamically shrouded by a winch fairing 128 affixed to the tow actuation element 112, the forward vehicle 104, or both.

Figure 6:
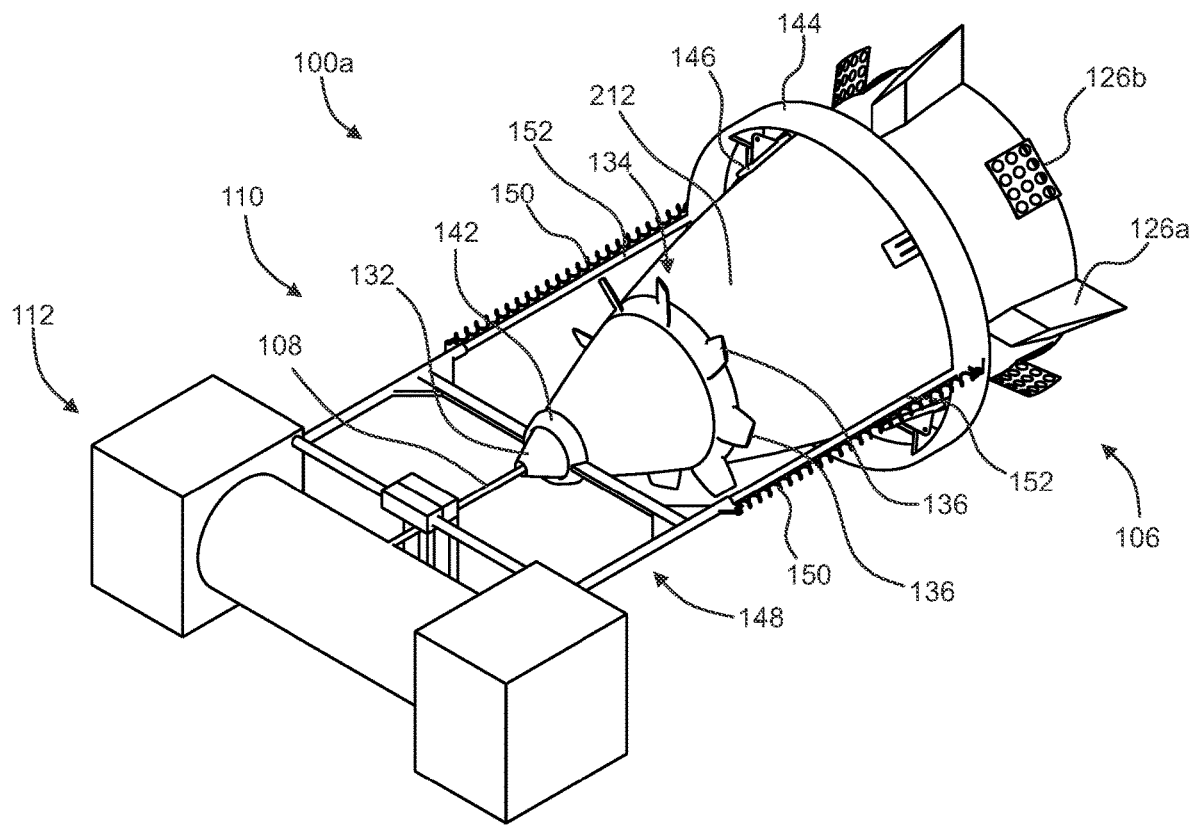
FIG. 6 is a diagrammatic perspective view of a forward portion of an example system for reconnectably coupling an aft vehicle to a forward vehicle in flight.
Figure 7:
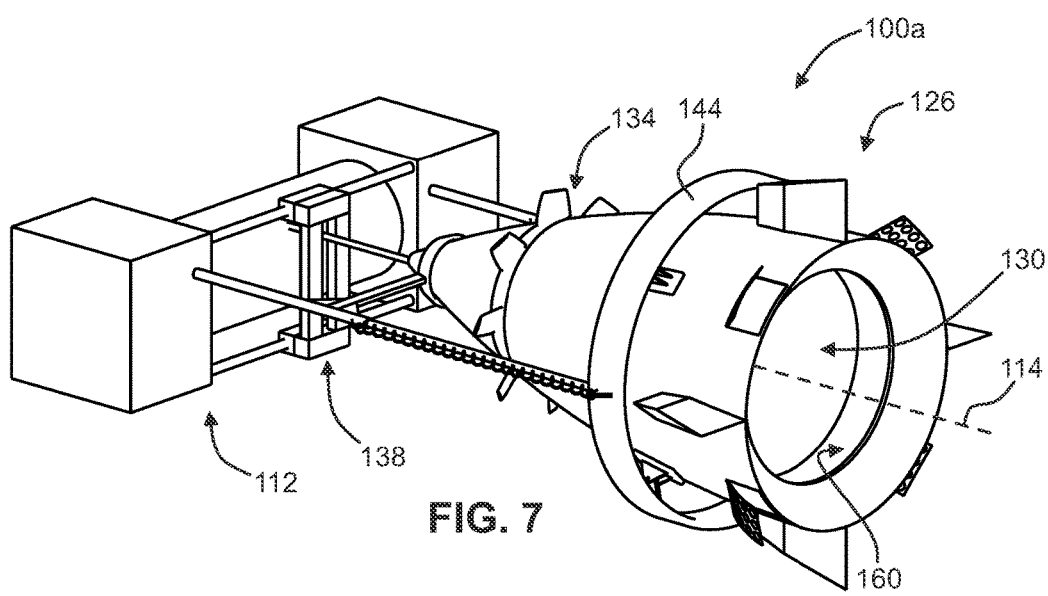
FIG. 7 is a further diagrammatic perspective view of the forward portion shown in FIG. 6.

Referring to FIGS. 5-7, the coupler element 106 may have a line connection portion 132, a probe receiver port 130, and a plurality of aerodynamic control elements 126. A coupler longitudinal axis 114 may be defined as extending from the line connection portion 132 through the probe receiving port 130. The probe receiver port 130 may be configured to receive and releasably retain a probe portion 140 of the aft vehicle 102. The coupler element 106 may include a pressure relief duct 224 disposed in communication between the probe receiver port 130 and an outer surface of the coupler element 212. The coupler element 106 may be movable with respect to the docking structure 110 between a docked position (see, for example, FIG. 6) and an undocked position (see, for example, FIG. 10). Referring to FIG. 5, movement of the coupler element 106 may be restrained with respect to the docking structure 110 when in the docked position.

Figure 8:
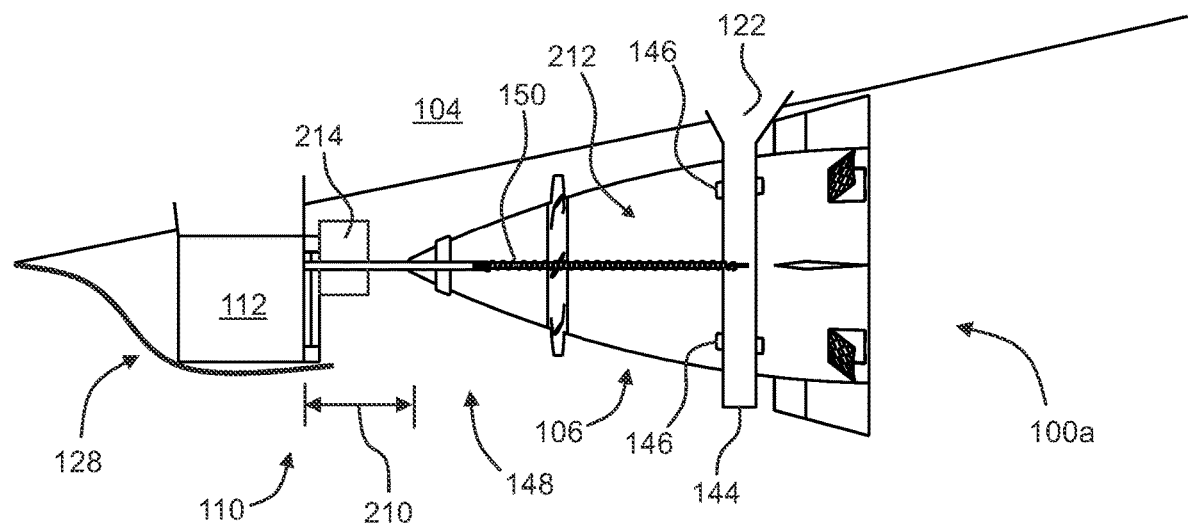
FIG. 8 is a diagrammatic side view of the forward portion similar to that shown in FIG. 6, but wherein a winch fairing and line sever element are shown included in the system.
Figure 9:
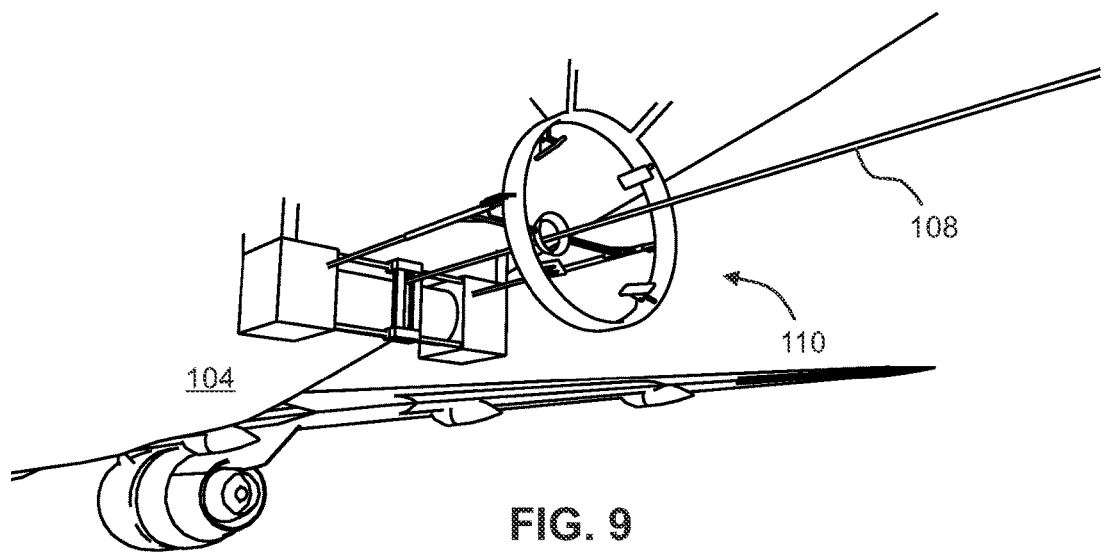
FIG. 9 is a diagrammatic perspective view of a docking structure and tow actuation element affixed to a forward vehicle, wherein the line extension length of the tow line element is increased to allow the coupler element to move to an undocked position.

Referring to FIG. 3, the tow line element 108 may have a proximal end 206, a distal end 208, and a line extension length 210. The proximal end 206 may be attached to the tow actuation element 112. The distal end 208 may be permanently or releasably connectable to the coupler element 106. The line extension length 210 may be defined from the tow actuation element 112 to the line connection portion 132. Referring to FIGS. 3 and 8, the tow actuation element 112 may be configured to increase and decrease the line extension length 210. Depending upon that particular implementation of the system 100, the tow line element 108 may be, for example, a cable, metallic or fibrous rope, a refueling hose, some combination thereof, or the like. In cases in which the tow line element 108 is a refueling hose, the coupler element 106 may be configured with a fuel interface portion by which the hose is sealably connectable in fluid communication with the probe portion 140.

Referring to FIGS. 2 and 12-14, the aerodynamic control elements 126 (for example, 126a and 126b) may be configured to adjust lateral positioning (for example, 172 and 174) and vertical positioning (for example, 168 and 170) of the coupler element 106 with respect to the probe portion 140 when the system 100 is in flight. The coupler element 106 is preferably configured to have a higher aerodynamic frequency response than the aft vehicle 102. This may be due to, for example, the coupler element 106 having a lower mass and higher control authorities compared to the aft vehicle 102.

Referring to FIGS. 12-14, in certain preferred embodiments of the system 100, the aerodynamic control elements 126 may include one or more actuatable control surfaces. The aerodynamic control surfaces may include primary control surfaces, such as one or more pivotable fins 126a (see, for example, FIG. 15). Alternatively or in addition, the aerodynamic control surfaces may include one or more drag flaps 126b which are extendable and retractable (see, for example, FIG. 16). In particular embodiments of the system 100, the aerodynamic control elements 126 may comprise reaction controls such as thrusters or puffers instead of, or in addition to, movable aerodynamic control surfaces. Puffers may be, for example, laterally-directed nozzles configured to selectively redirect longitudinally incoming airflow.

Referring to FIGS. 2 and 12-14, the aerodynamic control elements 126 are preferably configured to control movement of the coupler element 126 in radial directions with respect to the coupler longitudinal axis 114 when the system 100 is in flight. Such radial directions may include, for example, vertical directions 168 and 170 and lateral directions 172 and 174. Moreover, the aerodynamic control elements 126 may be configured to control roll 162, pitch 164 and/or yaw 166 movement of the coupler element 106 when the system 100 is in flight. Furthermore, the aerodynamic control elements 126 may be configured to control the line tension 222 of the tow line element 108 when the system 100 is in flight.

Figure 11:
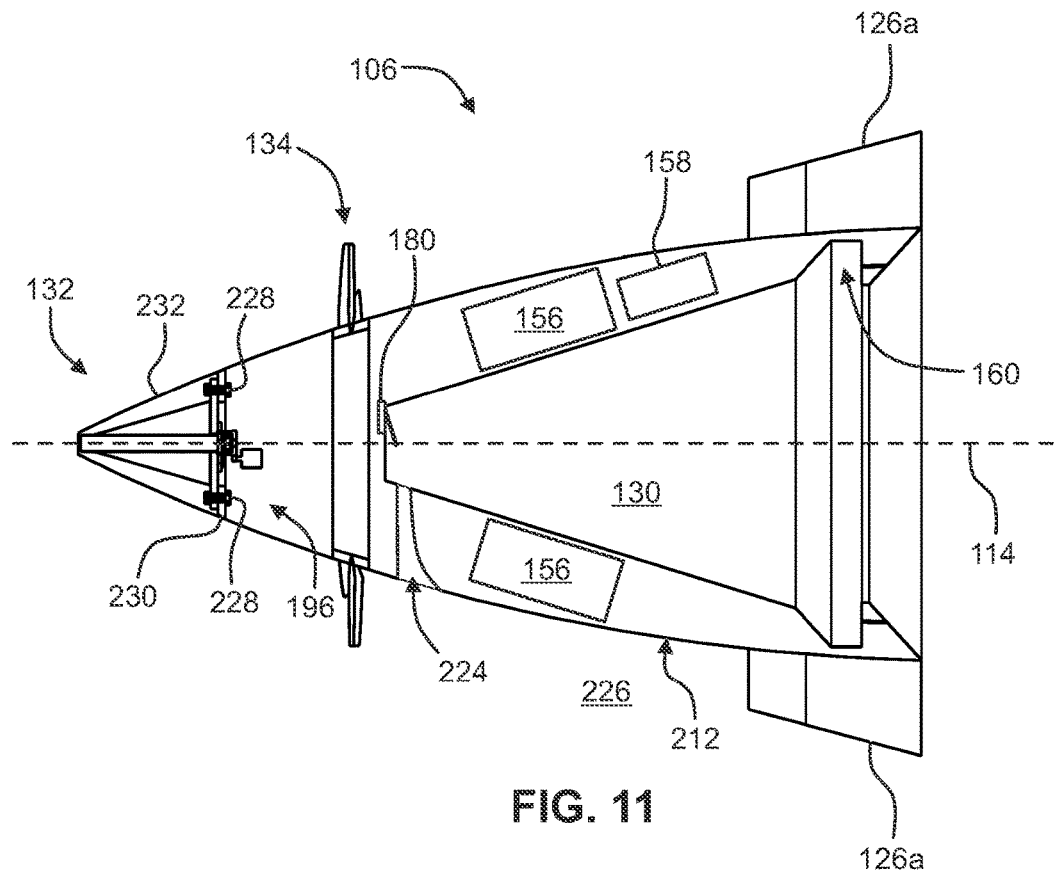
FIG. 11 is a diagrammatic cross-sectional view of an example coupler element taken along lines 11-11 in FIG. 10.
Figure 17:
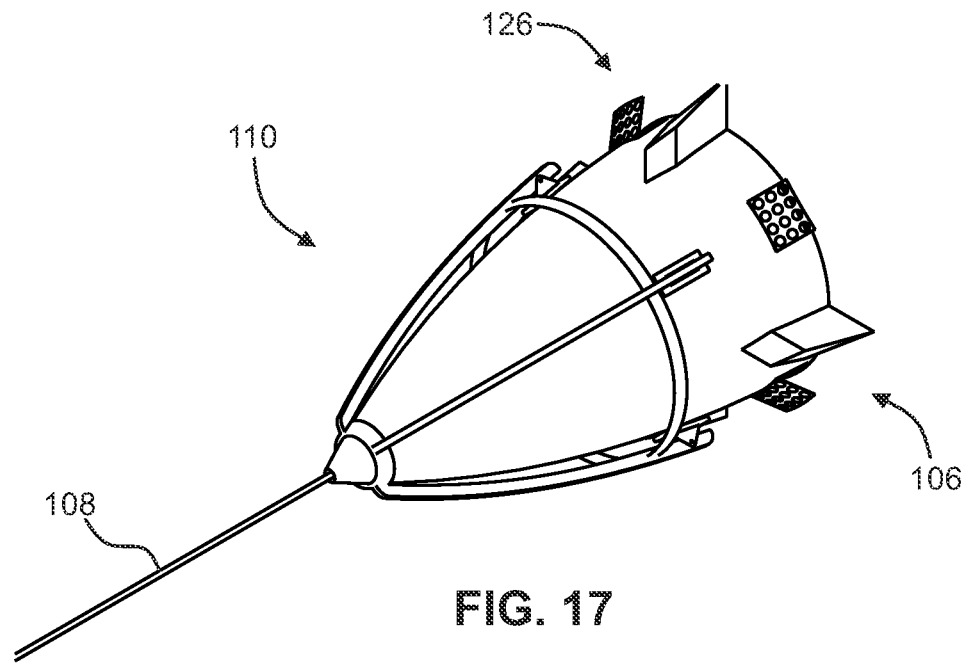
FIG. 17 is a diagrammatic perspective view of a portion of an alternate example system for reconnectably coupling an aft vehicle to a forward vehicle in flight, wherein the docking structure lacks a shuttle portion.
Figure 18:
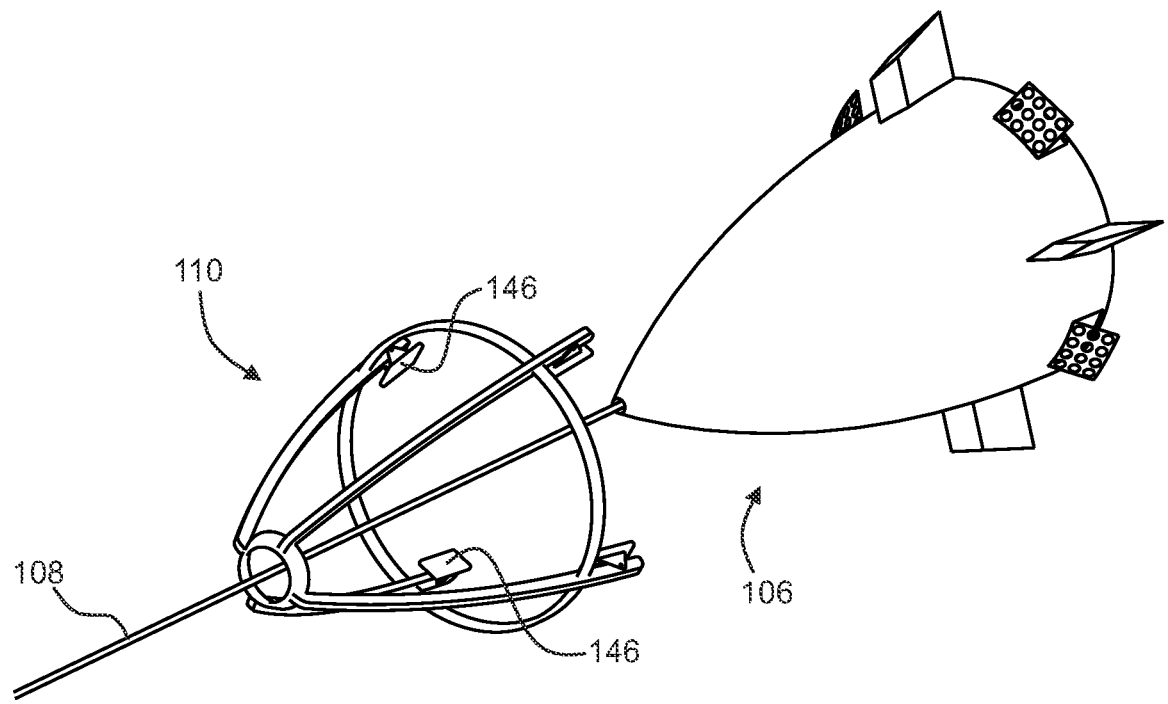
FIG. 18 is a diagrammatic perspective view similar to that of FIG. 17, but wherein the coupler element is shown in an undocked position.
Figure 19:
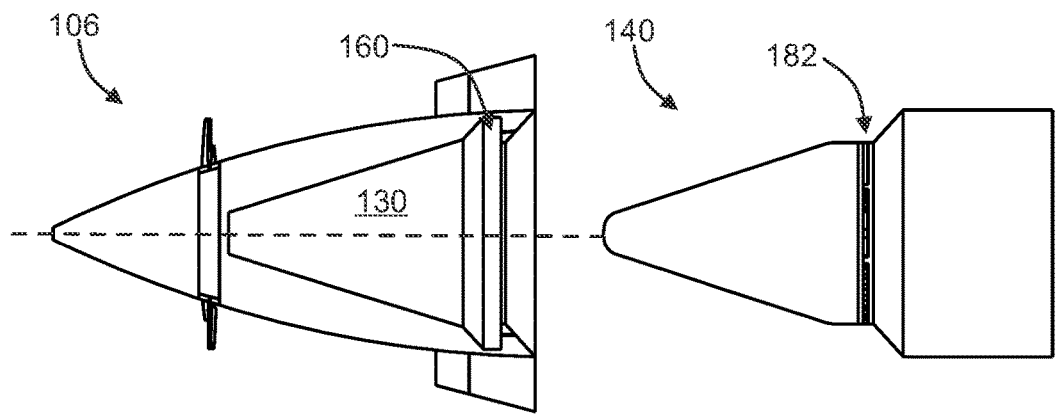
FIG. 19 is a diagrammatic cross-sectional view illustrating an example coupler element and an example probe portion out of engagement with one another.
Figure 20:
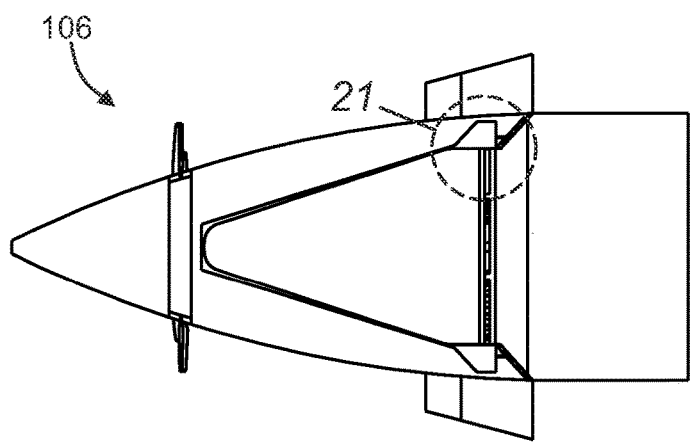
FIG. 20 is a diagrammatic cross-sectional view similar to that of FIG. 19, but wherein the probe portion is shown received by the probe receiving port of the coupler element, and the coupler securement portion is shown out of securing engagement with the probe securement portion.
Figure 21:
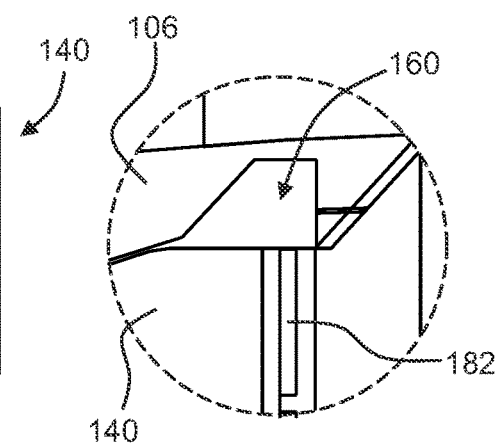
FIG. 21 is a magnified view of detail 21 in FIG. 20.
Figure 22:
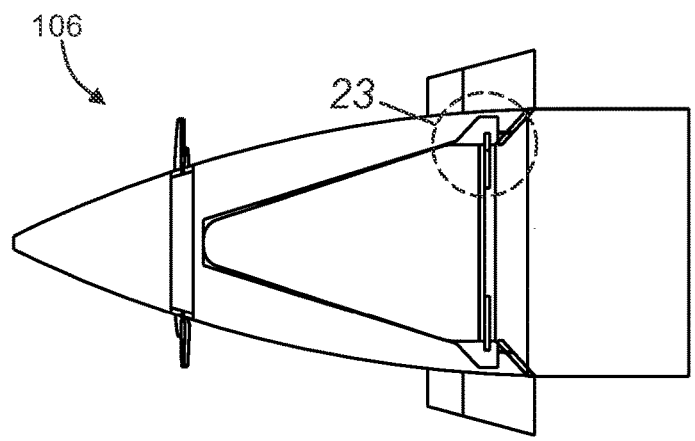
FIG. 22 is a diagrammatic cross-sectional view similar to that of FIG. 20, but wherein the coupler securement portion is shown in securing engagement with the probe securement portion.
Figure 23:
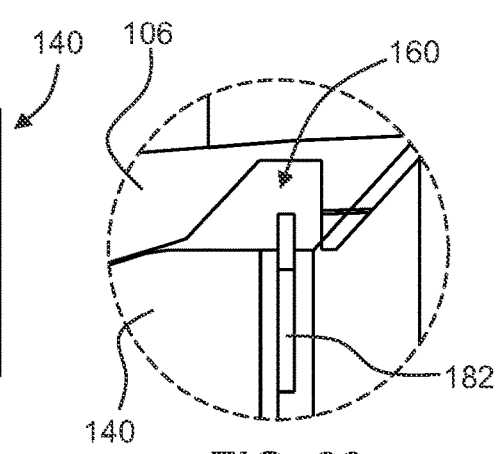
FIG. 23 is a magnified view of detail 23 in FIG. 22.

Referring to FIGS. 1, 2 and 11, the coupler element 106 may include control electronics 158 configured use position sensor data to (a) calculate a radial offset 118 between the coupler longitudinal axis 114 and the probe portion 140 (for example, a probe longitudinal axis 116), and (b) command use of the aerodynamic control elements 126 for reducing the radial offset 118. In particular embodiments of the system 100, the control electronics 158 may be further configured use position sensor data to (a) calculate a longitudinal distance 120 between the coupler element 106 and the probe portion 140, and (b) command the tow actuation element 112 to adjust the line extension length 210 for reducing the longitudinal distance 120.

Alternatively or in addition, in certain implementations of the system 100, the control electronics 158 may be configured to control relative movement between the forward vehicle 104 and aft vehicle 102 by sending commands to the forward vehicle 104, the aft vehicle 102, or both. For example, the control electronics 158 may be configured to send commands to the forward vehicle 104 to reduce its throttle or increase its drag, thereby reducing the airspeed of the forward vehicle 104 to facilitate closure with the aft vehicle 102. For further example, the control electronics 158 may be configured to send commands to the aft vehicle 102 to aerodynamically clean up (e.g., by retracting spoilers/drag flaps) to facilitate closure with the forward vehicle 104.

Referring to FIGS. 6 and 7, in certain implementations of a system 100 the coupler element 106 may include at least one rotary air turbine 134 comprising a plurality of turbine blades 136. In certain such embodiments, the coupler element 106 may include a pair of rotary air turbines 134 configured to rotate in opposite directions responsive to incoming airflow when the system 100 is in flight.

Referring to FIG. 11, the coupler element 106 may include one or more rechargeable batteries 156, and the one or more rotary air turbines 134 may be configured to charge the rechargeable batteries 156 when the system 100 is in flight. Alternatively or in addition, a rotary air turbine 134 on the coupler element 106 may be configured to charge one or more batteries within the aft vehicle 102, for example, by way of electrical connection through the probe portion 140.

Figure 10:
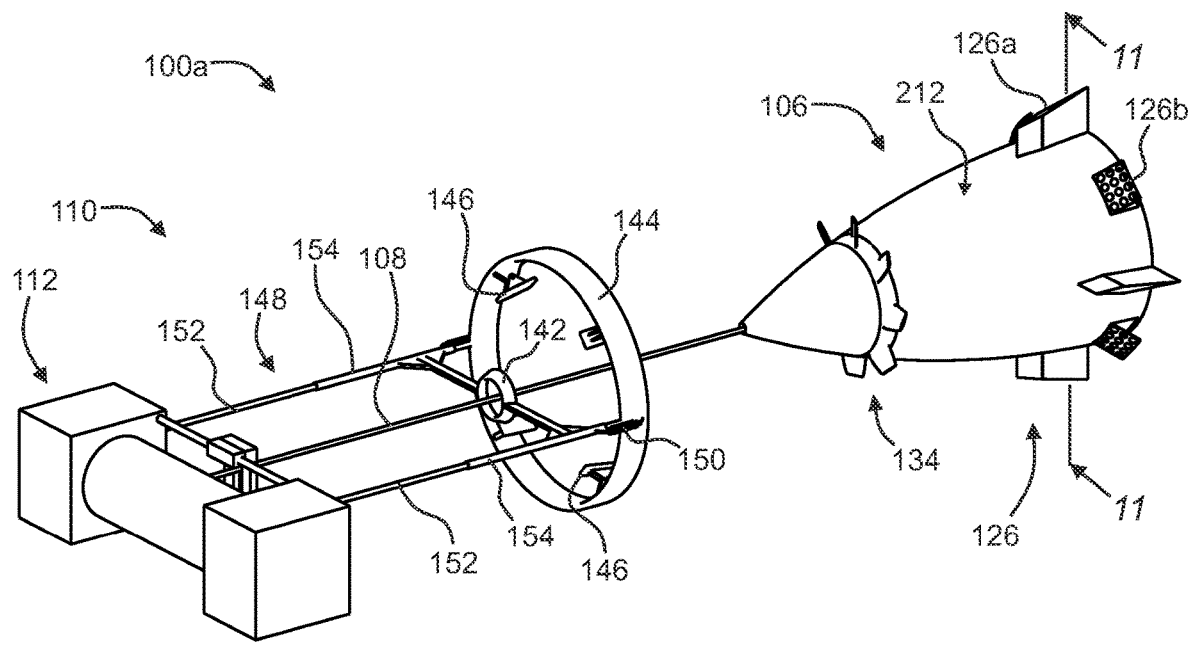
FIG. 10 is a diagrammatic perspective view of an example system for reconnectably coupling an aft vehicle to a forward vehicle in flight, wherein the coupler element is shown in an undocked position.

Referring to FIG. 6, in particular implementations of the system 100, the docking structure 110 may include a dock stabilization ring 144 for receiving the coupler element 106 when in the docked position. Referring to FIG. 10, the dock stabilization ring 144 may include a multiplicity of coupler guide plates 146 configured to conformingly engage an outer surface of the coupler element. The coupler guide plates 146 may be pivotably attached to the dock stabilization ring 144.

Referring to FIGS. 6 and 10, certain implementations of the docking structure 110 may include a shuttle portion 148 which may be movable with respect to the dock stabilization ring 144 between a coupler capture position (see, for example, FIG. 6) and a coupler release position (see, for example, FIG. 10). The shuttle portion 148 may include a nose retention element 142 configured to, for example, receivingly and aligningly engage the line connection portion 132 of the coupler element 106. When in the coupler release position, the shuttle portion 148 may be configured to hold the coupler element 106 out of conforming engagement with the coupler guide plates 146. Referring to FIG. 6, when in the coupler capture position, the shuttle portion 148 may be configured to allow the coupler element 106 to be engaged by the coupler guide plates 146.

Referring to FIG. 10, the shuttle portion 148 may be resiliently biased toward the coupler release position. The resilient bias may be provided by one or more shuttle springs 150, and may be configured to be overcome by way of the tow actuation element 112 reducing the extension length 210 after the coupler element 106 has engaged the shuttle portion 148. The shuttle portion 148 may include one or more shuttle guide tubes 154 guidedly transportable along corresponding shuttle guide rails 152. In such cases, the shuttle guide rails 152 may each extend from the tow actuation element 112 to the dock stabilization ring 144.

Referring to FIG. 8, certain implementations of the system 100 may comprise a line sever element 214 configured to sever the tow line element 108 when commanded to do so.

Figure 31:
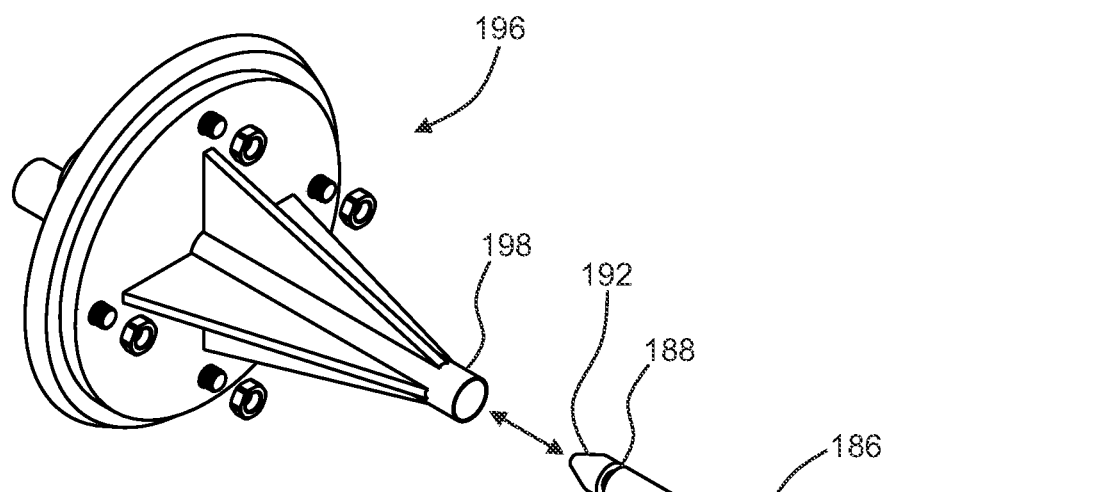
FIG. 31 is a diagrammatic perspective view of an example tow pin engagement element, with a corresponding tow pin shown removed therefrom.
Figure 32:
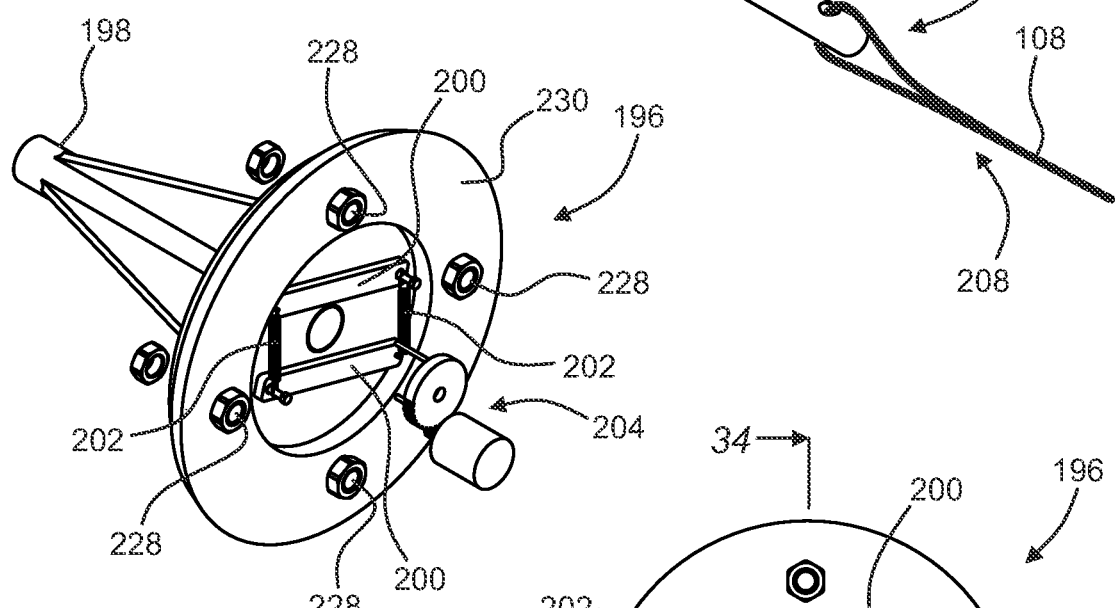
FIG. 32 is a diagrammatic partially exploded view of the example tow pin engagement element of FIG. 31.
Figure 33:
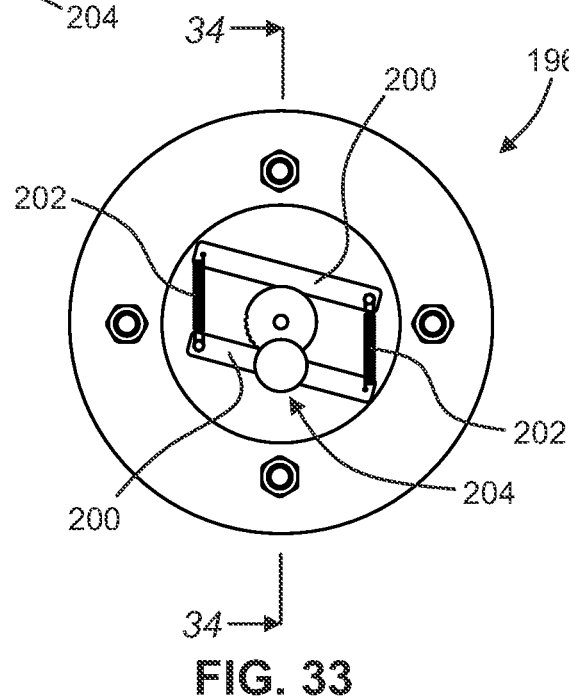
FIG. 33 is a diagrammatic rear view of the example tow pin engagement element of FIG. 31.
Figure 38:
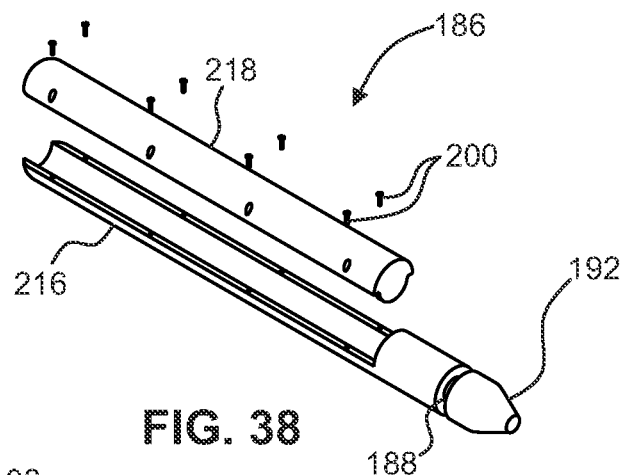
FIG. 38 is a diagrammatic exploded view of an alternate example of a tow pin, wherein clamp portions are configured to clampingly retain the distal end of the tow line element.
Figure 39:
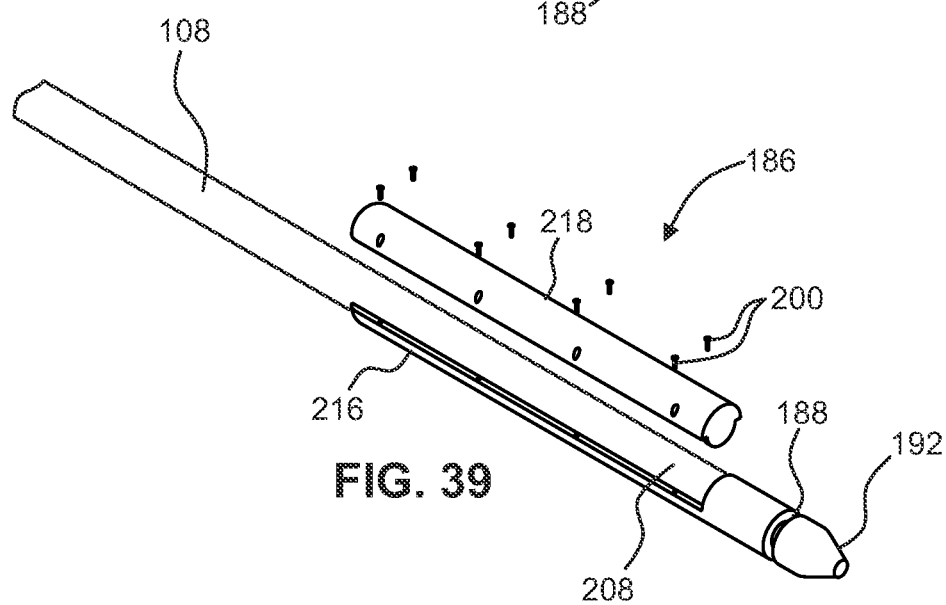
FIG. 39 is a diagrammatic exploded view similar to that of FIG. 38, but wherein the distal end of the tow line element is disposed within the primary clamp portion of the tow pin.
Figure 40:
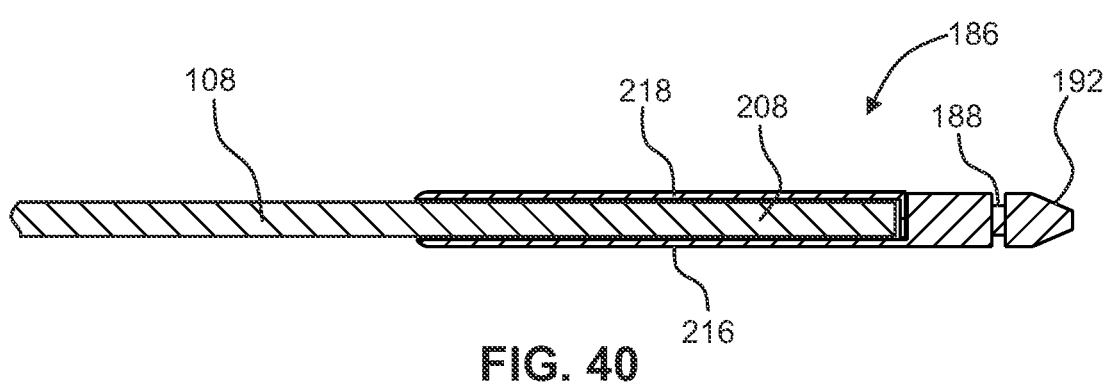
FIG. 40 is a diagrammatic cross-sectional view illustrating the tow pin of FIG. 38 in clamping engagement with the distal end of the tow line element.

Referring to FIGS. 11 and 32, in particular implementations of the system 100, the coupler element 106 may include a tow pin engagement element 196 having a pin barrel 198 and a pin detent latch 200. The pin detent latch 200 may be movable into a latch position (see, for example, FIG. 35) and out of a latch position (see, for example, FIG. 36). Referring to FIG. 31, the distal end 208 of the tow line element 108 may be connectable to a tow pin 186 by way of, for example, interface between a line interface portion 190 of the tow pin 186 a pin connection configuration 194 associated with the distal end 208. Referring to FIGS. 38-40, certain embodiments of a tow pin 186 may be configured to be connected to the distal end 208 of the tow line 108 by a clamping arrangement. For example, the tow pin 186 may comprise a primary clamp portion 216, a secondary clamp portion 218 and one or more clamp fasteners 200 (e.g., screws, bolts or rivets) cooperating to result in a tow pin 186 which clampingly envelops all or a portion of the distal end 208.

Figure 41:
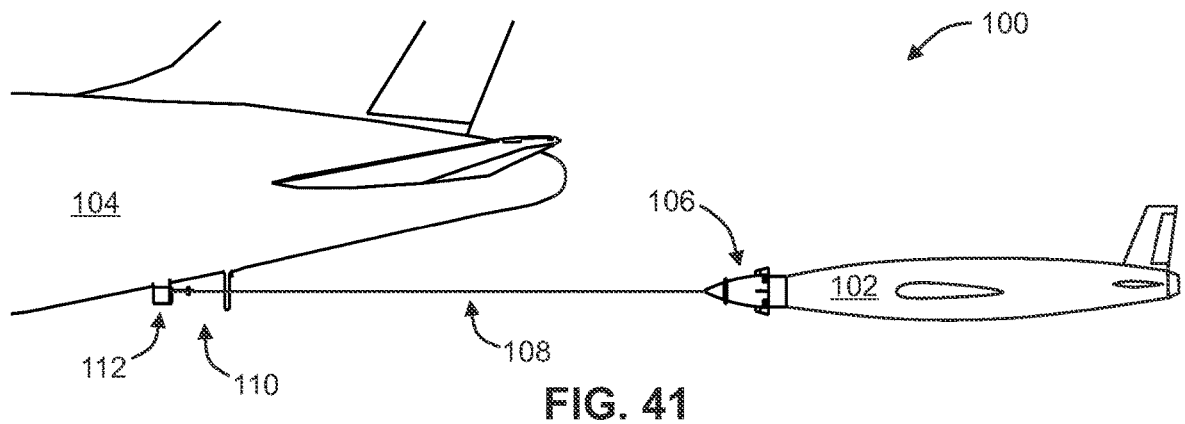
FIG. 41 is a diagrammatic side view of one example system for reconnectably coupling an aft vehicle to a forward vehicle in flight, wherein the tow line element is under tension due to the forward vehicle towing the aft vehicle.
Figure 42:
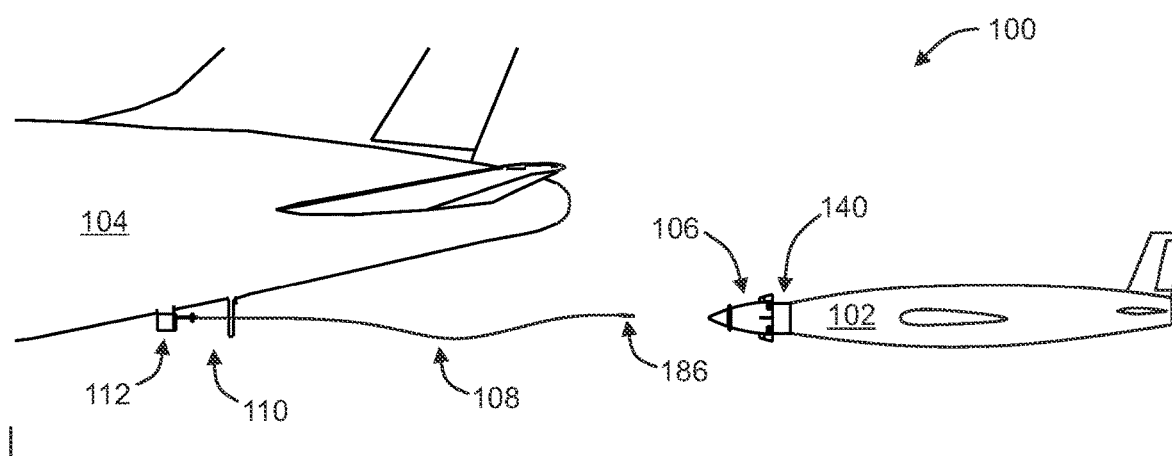
FIG. 42 is a diagrammatic side view similar to that of FIG. 41, but wherein the tow pin has been released from the tow pin engagement element, thereby leaving the coupler element secured to the probe portion of the aft vehicle.

Referring to FIGS. 34 and 35, the tow pin 186 may be insertable into the pin barrel 198 and configured to be engaged by the pin detent latch 200 in the latch position. In a preferred implementation, when the tow pin 186 is engaged by the pin detent latch 200, the tow pin 186 is prevented from being removed from the pin barrel 198. In such preferred implementation, referring to FIGS. 36 and 37 for example, when the tow pin 186 is out of engagement with the pin detent latch 200, the tow pin 186 is removable from the pin barrel 198. Referring to the sequence illustrated by FIGS. 41 and 42, this type of tow pin engagement subsystem may advantageously allow the coupler element 106 to be rapidly released from the tow line element 108 in emergency cases in which, for example, the coupler element 106 becomes stuck on the aft vehicle 102.

The pin detent latch 200 may be elastically biased (for example, by way of one or more pin detent springs 202) toward the latch position. The tow pin engagement element 196 may include a pin detent actuator 204 configured to move the pin detent latch 200 out of the latch position responsive to a command (e.g., an electrical or RF signal). Such commands may be transmittable from the forward vehicle 104. In certain implementations of the tow pin engagement element 196, the pin detent actuator 204 may be a motor, a solenoid, a pneumatic actuator, a pyrotechnic fastener, some combination thereof or the like.

Referring to FIGS. 34 and 35, the tow pin 186 may include a tapered end 192 configured to force the pin detent latch 200 against its elastic bias and away from the latch position as the tow pin 186 is inserted into the pin barrel 198, thereby allowing the tow pin 186 to partially axially extend past the pin detent latch 200. With the tow pin 186 having reached such axial position, the pin detent latch 200 may be configured to automatically engage a latch interface portion 188 of the tow pin 186 by way of the elastic bias of the pin detent latch 200. The latch interface portion 188 may be, for example, an arcuate or annular groove.

Figure 24:
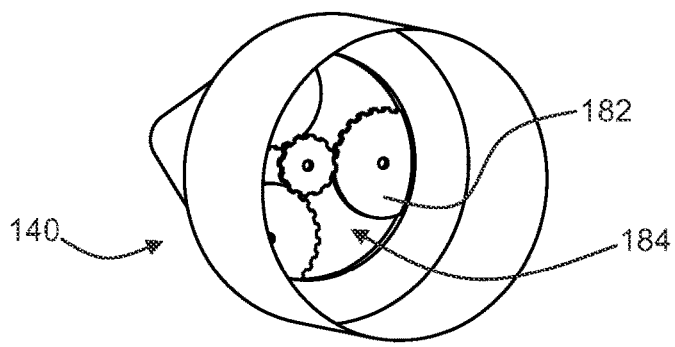
FIG. 24 is a diagrammatic perspective view of one example probe portion of an aft vehicle, showing a corresponding coupler securement portion and lock mechanism.
Figure 25:
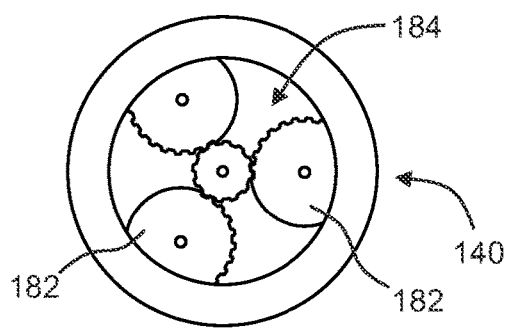
FIG. 25 is a diagrammatic rear view of the probe portion of FIG. 24, wherein the coupler securement portion is shown in a coupler disengagement configuration.
Figure 28:
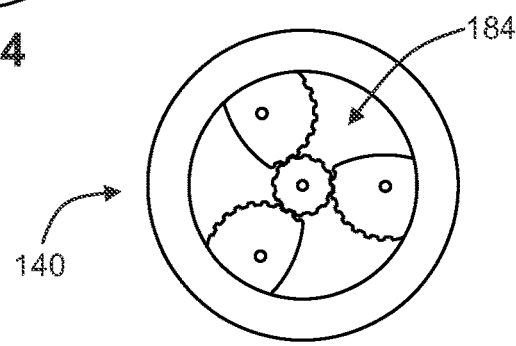
FIG. 28 is a diagrammatic rear view of the probe portion of FIG. 24, but wherein the coupler securement portion is shown in a coupler engagement configuration.
Figure 26:
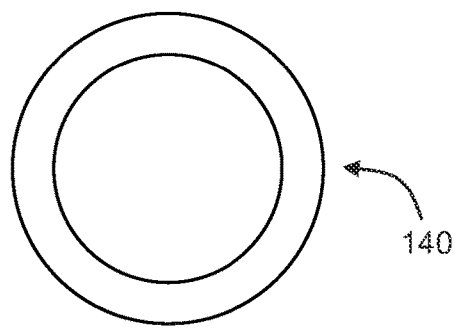
FIG. 26 is a diagrammatic front view of the probe portion of FIG. 25, wherein the coupler securement portion is shown in a coupler disengagement configuration.
Figure 29:
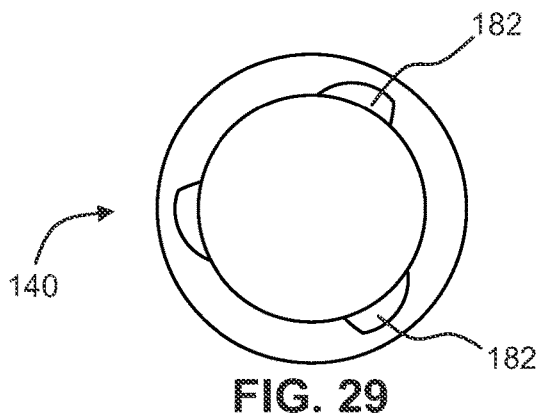
FIG. 29 is a diagrammatic front view of the probe portion of FIG. 28, wherein the coupler securement portion is shown in a coupler engagement configuration.
Figure 27:
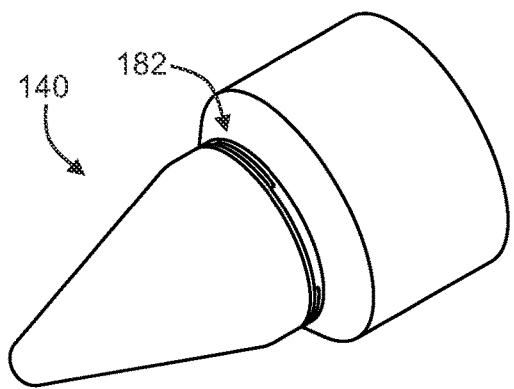
FIG. 27 is a diagrammatic perspective view of the probe portion of FIG. 25, showing the coupler securement portion in a coupler disengagement configuration.
Figure 30:
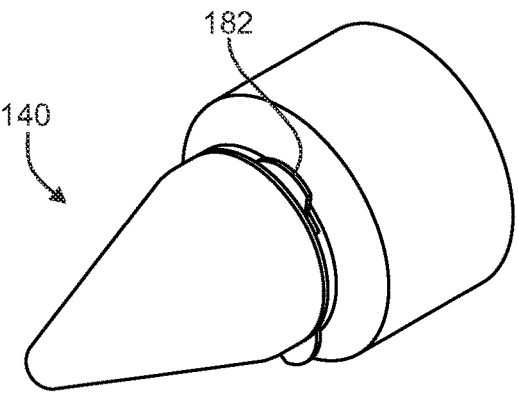
FIG. 30 is a diagrammatic perspective view of the probe portion of FIG. 28, showing the coupler securement portion in a coupler engagement configuration.

Referring to FIG. 1, particular implementations of a system 100 may include an aft vehicle 102 having a probe portion 140. Referring to FIGS. 19 to 23, the probe portion 140 may include a coupler securement portion 182 securingly engageable with a probe securement portion 160 in the probe receiver port 130 for controllably locking the probe portion 140 within the probe receiver port 130. Referring to FIGS. 24 and 25, the coupler securement portion 182 may include a lock mechanism 184 (e.g., motorized) configured to move the coupler securement portion 182 into and out of the securing engagement with the probe securement portion 160. Referring to FIGS. 29 and 30, the coupler securement portion 182 may include a plurality of radially-extendable tabs. Relatedly, referring to FIGS. 21 and 23, the probe securement portion 160 may include one or more grooves configured to receive the radially-extendable tabs when the coupler securement portion 182 is in the securing engagement.

Referring to FIGS. 11 and 28-30, lock mechanism 184 may be commanded into a lock configuration (moving the coupler securement portion 182 into the securing engagement) responsive to, for example, engagement of a probe insert sensor 180 by the probe portion 140. Once in the lock configuration, the lock mechanism 184 may be configured to move the coupler securement portion 182 out of the securement engagement responsive to, for example, a disengagement command (e.g., electrical or RF signal) originating from the coupler control electronics 158, the forward vehicle 104 or the aft vehicle 102.

Disclosed below are specific features and steps of certain non-limiting example systems and methods in accordance with the present disclosure.

Forward Vehicle

A forward vehicle 104 may be, for example, an aircraft or other vehicle (manned or unmanned) utilized to provide propulsive force to tow an aft vehicle 102, through the use of a controlled coupling device 106 interface. Additionally or in the alternative, a forward vehicle 104 may be a tanker aircraft used to transfer fuel through a hose to the aft vehicle 102, through the controlled coupling device 106.

Controlled Coupling Device

The methods disclosed herein may utilize a controlled coupling device 106 located at the aft tip of the tow line element 108 extended from the forward vehicle 104, that autonomously, and actively, positions itself in front of an aft vehicle 102 (piloted or unmanned, powered or unpowered) using, for example, a combination of differential GPS and optical tracking systems to support closed-loop navigation between the controlled coupling device 106 and the aft vehicle 102 being connected (or refueled). Once the controlled coupling device 106 is positioned in front of the aft vehicle 102, the distance between the forward and aft vehicles is reduced until the vehicles make contact and connect with each other. This may be achieved, for example, by the forward vehicle (e.g., forward aircraft) that is towing the controlled coupling device 106 slowing to close the distance between the controlled coupling device 106 and the aft vehicle 102. Alternatively, the aft vehicle 102 could increase its speed relative to the controlled coupling device 106 to close the distance between itself and the controlled coupling device 106 to engage and connect with it. The relative distance between the controlled coupling device 106 and the aft vehicle 102 may also be reduced by extending the tow line element 108 further from the forward vehicle 104 (e.g., tow aircraft) until contact with the aft vehicle 102 is achieved, and a connection between the forward and aft vehicles is mechanically secured.

While the longitudinal distance between the controlled coupling device 106 and the aft vehicle 102 is decreasing, the controlled coupling device 106 would actively maintain its vertical and lateral alignment directly in front of the aft vehicle 102. Referring to FIGS. 2 and 3, this ensures engagement along the common longitudinal axis between the controlled coupling device 106 and the aft vehicle 102.

The controlled coupling device 106 may be a conical (or bi-conic) shape a similar body of rotation (not necessarily symmetric) for minimum aerodynamic drag. Alternatively, the outer mold line 212 of the controlled coupling device 106 may be shaped to mate up with the front nose section of the aft vehicle 102 such that when mated with the aft vehicle 102 it forms the completed nose section of the aft vehicle 102.

The controlled coupling device 106 may include maneuver control surfaces 126 (e.g., primary control surfaces like fins 126a). These control surfaces may be mounted on the surface of the controlled coupling device 106, and may be capable of independent pivotable or hinged movement, thereby allowing the controlled coupling device 106 to maneuver in an agile fashion while maintaining a desired position (e.g., vertical and lateral) or rotational orientation with respect to the probe portion 140 of the aft vehicle 102.

Deployable drag flaps 126b may be mounted on the surface of the controlled coupling device 106, and may be conformal to the outer surface 212 of the controlled coupling device 106 when retracted. The drag flaps 126b may be independently extendable to aid in maneuvering and positioning the controlled coupling device 106 horizontally, vertically, or in the yaw axis, while increasing drag to increase tow line (e.g., cable or hose) tension and dampen tow line (e.g., cable or hose) dynamics.

An open probe receiver port 130 in the aft end of the controlled coupling device 106 may be configured to receive a matching probe portion 140 of the aft vehicle 102. A circumferential locking device (e.g., coupler securement portion 182 and lock mechanism 184) may be provided to securely, mechanically mate the controlled coupling device 106 with the aft vehicle 102. In the case of towing, the probe portion 140 may be the front of a towed vehicle 102, and the mated pair may therefore form the completed nose section (or outer mold line) of the aft vehicle 102.

Alternate methods of attaching the controlled coupling device 106 to the aft vehicle 102 may include extendable locking pins, rings, or tabs, deployed mechanically, hydraulically, magnetically, pneumatically, or via electro-mechanical actuators.

Aft Vehicle

Depending upon the implementation of the system 100, the aft vehicle 102 could be a piloted or unmanned vehicle, powered or unpowered, or a refueling or connection probe of an existing aircraft. In one embodiment, once the controlled coupling device 106 connects to the aft vehicle 102, the mated pair constitute the nose of an aircraft designed to be towed in-flight by the forward vehicle (e.g., towing aircraft) 104.

The aft vehicle may be shaped to conform to the controlled coupling device 106 when mated or connected. Optionally, a connecting probe, not conformal to the controlled coupling device 106, may be utilized to attach a small aircraft or unmanned aerial vehicle to the controlled coupling device 106 for retrieval or recovery by the forward vehicle (e.g., towing aircraft) 104. Optionally, the probe portion 140 (e.g., a receptacle or probe) may be mounted on, or extend from, an aft vehicle 102 (e.g., aircraft) being refueled from a tanker aircraft connected to the controlled coupling device 106 via a hose designed to transfer fuel to the receiving vehicle (piloted or autonomously controlled) through the controlled coupling device 106.

Control of the Controlled Coupling Device

The controlled coupling device 106 would typically feature multiple control surfaces 126 that could be either deployable or fixed in place. Referring to FIGS. 15 and 16, the control surfaces may employ, for example, a pivotable or a hinged control surface design. The controlled coupling device 106 could also feature deployable drag flaps 126b to take up slack in the line (e.g., increase line tension 222) and assist in positioning the controlled coupling device 106 in front of the aft vehicle 102. Robust, high control authority surfaces on the controlled coupling device 106 allow it to "station keep" itself directly in front of the aft vehicle 102, thereby enabling low maneuverability aft vehicles 102 to connect without requiring significant maneuvering of the aft vehicle 102.

Secure Mechanical Connection

The controlled coupling device 106 may preferably connect to the aft vehicle 102 through a device specifically designed for the function being performed. For towing the aft vehicle 102, the mechanical connection system would be required to withstand the forces necessary to tow the aft vehicle 102 and may consist of a robust ring, extendable tabs, or probe on the aft vehicle 102 which attaches to a receiver port 130 within the rear, interior portion of the controlled coupling device 106. The receiver port 130 could contain a sensor 180 which triggers a locking mechanism 184 once the aft vehicle's nose (or probe) advances deep enough into the receiver port 130 of the controlled coupling device 106. For in-flight refueling, the mechanical connection could be designed to accommodate existing probes/booms in use on refuellable aircraft today and may be configured to meet break-away requirements for those aircraft. For drone mother ship functions, the securing mechanism could resemble a grappling hook designed to withstand the force required to pull the drone to the mothership after capture.

Tow Actuation Element

The tow line element 108 would preferably attach to the forward vehicle 104 via a tow actuation element 112 (such as a powered reel or winch) mounted to the aft underside of the forward vehicle 104. The tow actuation element 112 may therefore be capable of deploying and retracting 1000 feet or more of tow line incrementally, on the ground or in flight. The reel would be powered to deploy and retract the towline and may utilize a closed-loop control system to allow for precise, control of the tow line at any released increment. The reel may preferably have an aerodynamic fairing 128 around it to minimize aerodynamic drag and buffeting. The reel may also feature a line sever element 214 (e.g., a guillotine or hot-wire system) designed to cut or sever the tow line, thereby releasing it from the reel in the event of an in-flight emergency.

Alternate (Emergency) Method for Releasing the Towline from the Controlled Coupling Device:

The aft tip of the tow line element 108 could connect to the controlled coupling device 106 via one of several methods: a removable pin/latch system, or an openable loop/hook mechanism. The mechanism (such as that shown at 196) may allow for emergency, in-flight release of the tow line element 108 from the controlled coupling device 106 when mated to the aft vehicle 102. Additionally or in the alternative, referring to FIGS. 43 and 44, the mechanism 196 could be attached to the controlled coupling device 106 with explosive bolts 228 allowing for a secondary method of releasing the tow line element 108 in an in-flight emergency. The nose of the controlled coupling device 106 may consist of a frangible composite fairing 232 (e.g., covering the release mechanism) to allow for the clean separation of the mechanism 196 from the controlled coupling device 106 while maintaining a streamlined aerodynamic surface.

The emergency release mechanism may be configured to engage with a tow pin attached to the tow line element via a clamping pin arrangement, where the tow line element is clamped in a cavity of a split tow pin, or via looping the towline through a cross hole in the forward portion of a solid tow pin. The release mechanism may employ spring-loaded latches, mounted on the aft side of the release bracket, that engage into a mating slot in the removable pin. This allows for the manual insertion and automatic securing of the tapered pin into the release mechanism without requiring access to the latching plates or powering up the release system. Release of the tow pin may be accomplished, for example, via rotation of a disk with pins that lift the spring-loaded latches out of the tow pin mating slot, allowing the tow pin to slide out of its guide tube, releasing the tow pin/tow line from the controlled coupling device. Rotation of the release disk may be via electro-mechanical, hydraulic or pneumatic actuators, motors, some combination thereof or the like. Mounting the latches on the aft side of the release bracket may allow for a small, lightweight, structurally robust, yet simple and reliable, emergency release mechanism.

Figure 43:
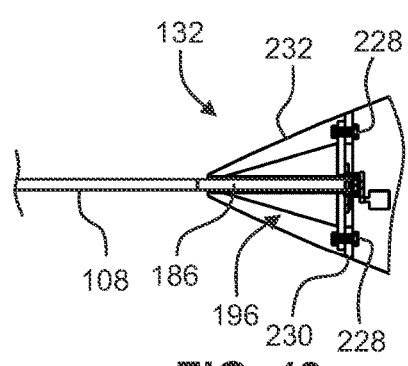
FIG. 43 is a diagrammatic cross-sectional view illustrating an example tow pin engagement element attached to a forward coupler bulkhead of a coupler element, wherein the attachment is by way of explosive bolts and the coupler element includes a frangible fairing enveloping the tow pin engagement element.
Figure 44:
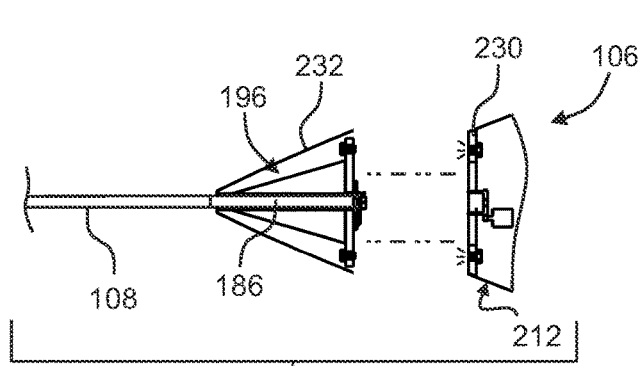
FIG. 44 is a diagrammatic cross-sectional view of the details in FIG. 43, but wherein the explosive bolts have been detonated, thereby allowing the tow pin engagement element to fracture the frangible fairing and separate from the coupler element.

Referring to FIGS. 43 and 44, the release mechanism 196 could also be attached to the controlled coupling device 106 with explosive bolts 228 allowing for a secondary method of releasing the tow line element 108 in an emergency. The nose of the release mechanism may comprise a frangible composite fairing 232 to allow for the clean separation of the release mechanism 196 from the controlled coupling device 106.

A swivelable mounting of the release mechanism to the controlled coupling device may also be employed to resolve the towline forces axially, or in-line, with the towline release mechanism (independent of the aft vehicle's orientation to the tow line element), to eliminate binding of the release mechanism due to lateral and/or vertical towline forces. One method of implementation may be the use of a two-axis gimbal mounted between the release mechanism and the controlled coupling device, thereby allowing the release mechanism to pivot freely, aligning the release mechanism axially with the tow line element.

Rotary Air Turbine

One or more rotary air turbines 134 may be employed on the controlled coupling device 106, and may comprise a rotating ring with small propeller blades 136. The air turbines 134 may be integrated into the external mold line of the vehicle and located at or toward the nose of the controlled coupling device 106. The rotary air turbine 134 may be configured to provide electrical power when in flight to continually charge internal batteries 156 that power movable fins, drag flaps, tow release mechanism, vehicle avionics systems, or the like. When not in use, the turbine blades 136 may be retractable via electromechanical, magnetic, pneumatic, or hydraulic systems to minimize aerodynamic drag and/or to eliminate the possibility of damage to the blades due to contact with external objects. Alternatively, the blades 136 may be of a hinged, folding design, that configures them to nest into conformal cavities in the outer mold line of the rotating ring. A shroud may optionally be used around the blades to provide protection for the blades and also for people working around the rotary air turbine. Another configuration with counter-rotating rings may be employed to eliminate any tendency for the controlled coupling device to roll when the blades are deployed.

Pressure-Relief Ducts

A series of small NACA air ducts (such as the duct 224 shown in FIG. 11) may be located in or toward the forward section of the probe receiver port 130 of the controlled coupling device 106. The ducts may be configured to allow high-pressure air from the inside the probe receiver port 130 of the controlled coupling device 106 to escape, thereby significantly reducing or eliminating high air pressure differential between the probe receiver port 130 and the ambient environment 226 as the mating sequence between the controlled coupling device 106 and the aft vehicle 102 is completed. Another method of eliminating the high-pressure differential could be internal ducts in the forward, mating surface of the aft vehicle 102, that connects to small NACA ducts located in the outer mold line of aft vehicle 102, aft of the mating surfaces between the controlled coupling device 106 and aft vehicle 102.

Docking Structure

A docking structure 110 is preferably located on or mounted to the forward vehicle 104, may be designed to securely capture and store the controlled coupling device 106 within the docking structure 110. Such configuration allows the forward vehicle 104 to land with the controlled coupling device 106 attached to the tow line element 108. The docking structure 110 would be configured to structurally support and stabilize the controlled coupling device 106, thereby preventing its movement once docked. The tow line element 108 may feed through an opening or guide 142 at the front of the docking structure 110 that would capture the nose of the controlled coupling device 106 as it is docked. Faired guides (e.g., coupler guide plates 146) would position the aft end of the controlled coupling device 106 within the docking structure 110.

The docking structure 110 may be of an open architecture, thereby allowing airflow around and through it to minimize weight, aerodynamic drag, and aerodynamic buffeting when the controlled coupling device 106 is deployed in towed flight. The tow line element 108 may feed through an opening (such as in forward towline guide 142) toward the front of the docking structure 110. The forward towline guide 142 would then capture the nose (e.g., line connection portion 132) of the controlled coupling device 106, thereby restricting its movement laterally and vertically. As the tow line element 108 is reeled in, the forward towline guide 142 would "steer" the nose of the controlled coupling device 106 into its captured, stowed position, while centering it in the docking structure 110. An aft faired ring 144, with guides 146 (e.g., conformal or protruded, low surface friction contact pads, or rollers) would center the aft end of the controlled coupling device 106 in place within the docking structure 110 once the controlled coupling device 106 enters the docking structure 110. Once docked, the guides 146 would be in contact with the outer mold line 212 of the controlled coupling device 106, positioned in front of the external control surfaces 126 of the controlled coupling device 106. The guides 146 may be configured to transfer the structural loads of carrying the controlled coupling device 106 through the faired ring 144 and adjacent mechanical components, to the mounting points on the forward vehicle 104. A brake on the reel 112 may then be engaged to prevent the tow line element 108 from being extended, thereby effectively locking the controlled coupling device 106 in place in the docking structure 110. For deployment of the controlled coupling device 106 from the docking structure 110, the process may be reversed.

Referring to FIG. 10, another embodiment of the docking structure 110 may employ a configuration in which the forward towline guide 142 would initially be located in approximately the same plane as the aft faired ring 144 and aligned axially with the center of the aft faired ring 144. This would ensure that as the tow line element 108 is reeled in, the controlled coupling device 106 will engage the forward towline guide 142 before it contacts the aft faired ring 144, thus eliminating the possibility of damage to the controlled coupling device 106 due to excessive, uncontrolled, movement in the vertical and/or lateral directions. Once the controlled coupling device 106 has fully engaged the forward towline guide 142 (in its aft position), the tow line element 108 would pull the controlled coupling device 106 forward, moving the towline guide 142 to its forward position, and drawing the controlled coupling device 106 into the docking structure (see, for example, FIG. 6). The controlled coupling device 106 would then make contact with the guides 146 on the aft faired ring 144, thereby centering the controlled coupling device 106 in its final stowed position. A brake on the reel 112 may then be engaged to prevent the tow line element 108 from being extended, thereby locking the controlled coupling device 106 in place in the docking structure 110. For deployment of the controlled coupling device 106 from the docking structure 110, the process may be reversed.

A set of rails or slide tubes (or equivalent, extendable, mechanical system) may be provided to limit the forward towline guide 142 motion to fore/aft movement along the shared axis of the forward towline guide 142 and aft faired ring 144. The forward towline guide 142 may be extended forward/aft via an electro-mechanical, pneumatic, hydraulic, or magnetic system.

Referring to FIGS. 6 and 10, in certain embodiments of the docking structure 110, the forward towline guide 142 may initially be positioned in the aft location in approximately the same plane and aligned along the center axis of the aft faired ring 144 by a set (or multiple sets) of springs 150 (e.g., mechanical extension, torsion, or coil). In such case, when the controlled coupling device 106 engages the forward towline guide 142, moving it into its forward, stowed position, the springs 150 are extended (or coiled if torsional) thereby adding energy to the springs 150. Once the controlled coupling device 106 is in the forward, stowed position, a brake on the reel 112 would be engaged to prevent the tow line element 108 from being extended, thereby locking the controlled coupling device 106 in place in the docking structure 110. For deployment of the controlled coupling device 106 from the docking structure 110, the brake would be released, and the process would be reversed. However, in this embodiment the energy stored in the springs 150 would move the forward towline guide aft 142, thereby forcibly separating the controlled coupling device 106 from the docking structure 110. This would mitigate the possibility of the controlled coupling device 106 becoming stuck in the docking structure 110, ensuring a clean deployment of the controlled coupling device 106 from the docking structure 110.

The following listing matches certain terminology used within this disclosure with corresponding reference numbers used in the non-limiting embodiments illustrated in the several FIGURES.

100 system for reconnectably coupling an after vehicle to a forward vehicle in flight
100a forward portion (of the system 100)
100b aft portion (of the system 100)
102 aft vehicle (e.g., piloted or unmanned, powered or unpowered aircraft)
104 forward vehicle (e.g., tow or refueling aircraft)
106 coupler element (i.e., controlled coupling device)
108 tow line element (e.g., cable or fuel hose)
110 docking structure
112 tow actuation element (e.g., a powered reel or winch)
114 coupler longitudinal axis
116 probe longitudinal axis
118 radial offset (e.g., between coupler and probe longitudinal axes)
120 longitudinal distance (e.g., offset between coupler element and aft vehicle)
122 dock mounting bracket
124 winch mounting bracket
126 aerodynamic control elements (e.g., control surfaces, reaction control, etc.)
126a primary control surface (e.g., pivotable control fins)
126b drag flap (e.g., extendable and retractable)
128 winch fairing
130 probe receiver port
132 line connection portion
134 rotary air turbine
136 turbine blades
138 line guide
140 probe portion (e.g., nose cone or refueling probe of aft vehicle)
142 nose retention element (e.g., "forward towline guide")
144 dock stabilization ring (e.g., "aft faired ring")
146 coupler guide plates (e.g., pivotably attached to dock stabilizing ring)
148 shuttle portion (movable between a coupler capture and coupler release position)
150 shuttle spring
152 shuttle guide rail
154 shuttle guide tube
156 battery (e.g., rechargeable)
158 coupler control electronics
160 probe securement portion (e.g., a latch groove)
162 roll
164 pitch
166 yaw 168 upward vertical direction
170 downward vertical direction
172 left lateral direction
174 right lateral direction
176 forward direction
178 rearward direction
180 probe insert sensor
182 coupler securement portion (e.g., one or more extendable tabs)
184 lock mechanism (to lock the coupler element and probe portion)
186 tow pin (e.g., affixed to end of tow line element; e.g., solid pin or split pin)
188 latch interface portion (of tow pin; e.g., annular groove)
190 line interface portion (of tow pin; e.g., eyelet or clamp portion)
192 tapered end (of tow pin)
194 pin connection (whereby tow line connects to tow pin; e.g., tow line loop or hook)
196 tow pin engagement element (e.g., with release mechanism)
198 pin barrel
200 pin detent latch
202 pin detent spring
204 latch release actuator
206 proximal end (of tow line)
208 distal end (of tow line)
210 line extension length (of tow line)
212 outer surface of coupler element (e.g., outer mold line of the coupler element)
214 line sever element
216 primary clamp portion (of tow pin)
218 secondary clamp portion (of tow pin)
220 clamp fastener (e.g., screws, rivets or the like)
222 line tension
224 pressure-relief duct
226 ambient environment
228 attachment bolts (e.g., explosive bolts)
230 forward coupler bulkhead
232 frangible fairing While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for reconnectably coupling an aft vehicle to a forward vehicle in flight, the system comprising:
    a docking structure configured to be affixed to the forward vehicle;
    a tow actuation element;
    a coupler element having a line connection portion, a probe receiver port, and a plurality of aerodynamic control elements, a coupler longitudinal axis being defined as extending from the line connection portion through the probe receiving port, the probe receiving port being configured to receive and releasably retain a probe portion of the aft vehicle, the coupler element being movable with respect to the docking structure between a docked position and an undocked position; and
    a tow line element having a proximal end, a distal end, and a line extension length, the proximal end being attached to the tow actuation element, the distal end being connectable to the coupler element, the line extension length being defined from the tow actuation element to the line connection portion;
    wherein
        (a) the tow actuation element is configured to increase and decrease the line extension length,
        (b) the aerodynamic control elements are configured to adjust lateral and vertical positioning of the coupler element with respect to the probe portion when the system is in flight, and
        (c) movement of the coupler element is restrained with respect to the docking structure when in the docked position;
    wherein the coupler element includes control electronics configured to
        (a) calculate a radial offset between the coupler longitudinal axis and the probe portion, and
        (b) command the aerodynamic control elements for reducing the radial offset;
    wherein the control electronics is configured to
        (a) calculate a longitudinal distance between the coupler element and the probe portion, and
        (b) command the tow actuation element to adjust the line extension length for reducing the longitudinal distance;
    wherein the docking structure includes a dock stabilization ring for receiving the coupler element when in the docked position; and
    wherein the dock stabilization ring includes a multiplicity of coupler guide plates configured to conformingly engage an outer surface of the coupler element.

2. A system for reconnectably coupling an aft vehicle to a forward vehicle in flight, the system comprising:
    a docking structure configured to be affixed to the forward vehicle;
    a tow actuation element;
    a coupler element having a line connection portion, a probe receiver port, and a plurality of aerodynamic control elements, a coupler longitudinal axis being defined as extending from the line connection portion through the probe receiving port, the probe receiving port being configured to receive and releasably retain a probe portion of the aft vehicle, the coupler element being movable with respect to the docking structure between a docked position and an undocked position; and
    a tow line element having a proximal end, a distal end, and a line extension length, the proximal end being attached to the tow actuation element, the distal end being connectable to the coupler element, the line extension length being defined from the tow actuation element to the line connection portion;
    wherein
        (a) the tow actuation element is configured to increase and decrease the line extension length,
        (b) the aerodynamic control elements are configured to adjust lateral and vertical positioning of the coupler element with respect to the probe portion when the system is in flight, and
        (c) movement of the coupler element is restrained with respect to the docking structure when in the docked position;
    wherein the coupler element includes control electronics configured to
        (a) calculate a radial offset between the coupler longitudinal axis and the probe portion, and (b) command the aerodynamic control elements for reducing the radial offset;

wherein the control electronics is configured to
(a) calculate a longitudinal distance between the coupler element and the probe portion, and
(b) command the forward vehicle or the aft vehicle to close the longitudinal distance;

wherein the docking structure includes a dock stabilization ring for receiving the coupler element when in the docked position; and wherein the dock stabilization ring includes a multiplicity of coupler guide plates configured to conformingly engage an outer surface of the coupler element.

3. A system for reconnectably coupling an aft vehicle to a forward vehicle in flight, the system comprising:
a docking structure configured to be affixed to the forward vehicle;
a tow actuation element;
a coupler element having a line connection portion, a probe receiver port, and a plurality of aerodynamic control elements, a coupler longitudinal axis being defined as extending from the line connection portion through the probe receiving port, the probe receiving port being configured to receive and releasably retain a probe portion of the aft vehicle, the coupler element being movable with respect to the docking structure between a docked position and an undocked position; and
a tow line element having a proximal end, a distal end, and a line extension length, the proximal end being attached to the tow actuation element, the distal end being connectable to the coupler element, the line extension length being defined from the tow actuation element to the line connection portion;
wherein
(a) the tow actuation element is configured to increase and decrease the line extension length,
(b) the aerodynamic control elements are configured to adjust lateral and vertical positioning of the coupler element with respect to the probe portion when the system is in flight, and
(c) movement of the coupler element is restrained with respect to the docking structure when in the docked position;
wherein the docking structure includes a dock stabilization ring for receiving the coupler element when in the docked position; and
wherein the dock stabilization ring includes a multiplicity of coupler guide plates configured to conformingly engage an outer surface of the coupler element.

4. The system as defined in claim 3, wherein the coupler guide plates are pivotably attached to the dock stabilization ring.

5. The system as defined in claim 3, wherein the docking structure includes a shuttle portion which
(a) is movable with respect to the dock stabilization ring between a coupler capture position and a coupler release position,
(b) when in the coupler release position, is configured to hold the coupler element out of the conforming engagement with the coupler guide plates, and
(c) when in the coupler capture position, is configured to allow the coupler element to be in the conforming engagement by the coupler guide plates.

6. The system as defined in claim 5, wherein the shuttle portion is resiliently biased toward the coupler release position.

7. The system as defined in claim 6, wherein the resilient bias is configured to be overcome by way of the tow actuation element reducing the extension length after the coupler element has engaged the shuttle portion.

8. A system for reconnectably coupling an aft vehicle to a forward vehicle in flight, the system comprising:
a docking structure configured to be affixed to the forward vehicle;
a tow actuation element;
a coupler element having a line connection portion, a probe receiver port, and a plurality of aerodynamic control elements, a coupler longitudinal axis being defined as extending from the line connection portion through the probe receiving port, the probe receiving port being configured to receive and releasably retain a probe portion of the aft vehicle, the coupler element being movable with respect to the docking structure between a docked position and an undocked position;
a tow line element having a proximal end, a distal end, and a line extension length, the proximal end being attached to the tow actuation element, the distal end being connectable to the coupler element, the line extension length being defined from the tow actuation element to the line connection portion; and
a said aft vehicle having a said probe portion;
wherein
(a) the tow actuation element is configured to increase and decrease the line extension length,
(b) the aerodynamic control elements are configured to adjust lateral and vertical positioning of the coupler element with respect to the probe portion when the system is in flight, and
(c) movement of the coupler element is restrained with respect to the docking structure when in the docked position;
wherein the probe portion includes a coupler securement portion securingly engageable with a probe securement portion in the probe receiver port for controllably locking the probe portion within the probe receiver port;
wherein the coupler securement portion includes a lock mechanism configured to move the coupler securement portion into and out of said securing engagement with the probe securement portion; and
wherein
(a) the coupler securement portion includes a plurality of radially-extendable tabs, and
(b) the probe securement portion includes one or more grooves configured to receive said radially-extendable tabs when the coupler securement portion is in the securing engagement.

* * * * *